(12) United States Patent
Yao et al.

(10) Patent No.: US 12,548,373 B2
(45) Date of Patent: Feb. 10, 2026

(54) INFORMATION PROCESSING APPARATUS, INFORMATION PROCESSING METHOD, AND STORAGE MEDIUM THAT DETECT A POSITION OF AN OBJECT IN AN AREA IN WHICH THE OBJECT PERFORMS AN ACTIVITY, BASED ON AN OBTAINED IMAGE

(71) Applicant: CANON KABUSHIKI KAISHA, Tokyo (JP)

(72) Inventors: Tetsuhiko Yao, Tokyo (JP); Atsushi Tamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 18/350,033

(22) Filed: Jul. 11, 2023

(65) Prior Publication Data

US 2024/0046705 A1 Feb. 8, 2024

(30) Foreign Application Priority Data

Aug. 3, 2022 (JP) .................................. 2022-124153
Aug. 31, 2022 (JP) .................................. 2022-137641

(51) Int. Cl.
G06K 9/00 (2022.01)
G06T 7/70 (2017.01)
G06V 40/20 (2022.01)

(52) U.S. Cl.
CPC .................. *G06V 40/20* (2022.01); *G06T 7/70* (2017.01)

(58) Field of Classification Search
CPC ........... G06T 7/70; G06V 20/52; G06V 40/20
See application file for complete search history.

(56) References Cited

U.S. PATENT DOCUMENTS

| | | | |
|---|---|---|---|
| 2018/0253603 A1* | 9/2018 | Yamamoto | G06V 20/52 |
| 2020/0057893 A1* | 2/2020 | Sato | G06V 20/53 |
| 2020/0152312 A1* | 5/2020 | Connor | G06V 20/20 |
| 2020/0293809 A1* | 9/2020 | Itakura | G06V 10/25 |
| 2020/0394807 A1* | 12/2020 | Horesh | G05D 1/0282 |
| 2020/0407059 A1* | 12/2020 | Kim | G06V 20/13 |
| 2021/0048829 A1* | 2/2021 | Deyle | G05D 1/0274 |
| 2021/0250496 A1* | 8/2021 | Fujita | H04N 1/2112 |
| 2021/0271896 A1* | 9/2021 | Yano | G06V 20/52 |
| 2021/0316452 A1* | 10/2021 | Ozaki | B25J 11/0005 |
| 2022/0026334 A1* | 1/2022 | Tamraz | G16H 15/00 |

FOREIGN PATENT DOCUMENTS

JP 2019084165 A 6/2019

* cited by examiner

*Primary Examiner* — Hadi Akhavannik
(74) *Attorney, Agent, or Firm* — Venable LLP

(57) ABSTRACT

An information processing obtains a captured image of an area where an object performs an activity, detects a position of the object in the area based on the obtained image, specifies an action of the object based on the obtained image, the action performed by the object at the detected position and deteriorates a state at the detected position, wherein, even after the object becomes no longer present at the position due to the action, the deteriorated state at the detected position is maintained, and outputs information in which a position in the area and an evaluation value are associated with each other and is generated based on the detected position and the specified action, the evaluation value calculated based on an index value corresponding to the specified action. A first index value corresponds to a first action and a second index value to a second, different from the first.

20 Claims, 25 Drawing Sheets

| CONTENT OF ACTION | VALUE FOR UPDATING DEGREE OF ATTENTION |
|---|---|
| TAKING OFF FOR TOE LOOP JUMP | 80 |
| ... | ... |
| JUMP LANDING | 40 |
| SKATING | 5 |
| JUMPING | 0 |
| RINK MAINTENANCE | RESET |

| CONTENT OF ACTION | VALUE FOR UPDATING DEGREE OF ATTENTION |
|---|---|
| IRON SHOT | 80 |
| OTHER SHOTS | 30 |
| JUMPING ON GREEN | 70 |
| RUNNING ON GREEN | 20 |
| LAWN/GREEN MAINTENANCE | -30 |
| NOT USED FOR 1 DAY | -10 |

| PERSONAL NAME | HELD ALLERGEN(S) |
|---|---|
| PRESCHOOLER A | CHICKEN EGG, WHEAT |
| PRESCHOOLER B | WHEAT |
| ... | ... |
| CHILDCARE WORKER D | WHEAT, SHELLFISH |
| ... | ... |

FIG.19

| CONTENT OF ACTION | VALUE FOR UPDATING DEGREE OF ATTENTION |
|---|---|
| VOMIT | 80 |
| SNEEZE | 40 |
| COUGH | 30 |
| TALKING | 10 |
| HAND TOUCH | 5 |
| PRESENT | 1 |
| ... | ... |
| CLEANING | RESET |

FIG.20

| PERSONAL NAME | HELD ALLERGEN(S) | ALLERGY INFORMATION |
|---|---|---|
| PRESCHOOLER A | CHICKEN EGG, WHEAT | DIARY PRODUCTS |
| PRESCHOOLER B | WHEAT | CHICKEN EGG |
| ... | ... | |
| CHILDCARE WORKER D | WHEAT, SHELLFISH | |
| ... | ... | |

INFORMATION PROCESSING APPARATUS, INFORMATION PROCESSING METHOD, AND STORAGE MEDIUM THAT DETECT A POSITION OF AN OBJECT IN AN AREA IN WHICH THE OBJECT PERFORMS AN ACTIVITY, BASED ON AN OBTAINED IMAGE

CROSS REFERENCE TO PRIORITY APPLICATIONS

This application claims the benefit of Japanese Patent Application No. 2022-124153 filed Aug. 3, 2022, and Japanese Patent Application No. 2022-137641 filed Aug. 31, 2022, each of which is hereby incorporated by reference herein in its entirety.

BACKGROUND

Field

The present disclosure relates to processing based on a captured image.

Description of the Related Art

A method in which information, from a camera to detect conditions in a predetermined area is used, has been proposed.

Japanese Patent Laid-Open No. 2019-84165 discloses a method in which the trajectory of movement of a person moving inside a residence is recorded with a camera, and an area covering the trajectory of movement is estimated as a dirty area.

A user may want to conduct an operation in which maintenance is performed only on spots where conditions have badly deteriorated in a predetermined area. In this case, it is necessary to detect how much the conditions have deteriorated at each position within the predetermined area. However, with a method in which conditions in the same manner are uniformly estimated across a region determined based on the trajectory of movement of a person as with Japanese Patent Laid-Open No. 2019-84165, it is impossible to detect how much the conditions have deteriorated at each position.

Also, due to the increasing prevalence of allergic diseases, and the like, there has been a need to detect positions where allergens are likely to be present in a predetermined area. However, with a method in which conditions in the same manner are uniformly estimated across a region determined based on the trajectory of movement of a person as with Japanese Patent Laid-Open No. 2019-84165, it is impossible to detect positions where allergens are likely to be present.

SUMMARY

An information processing apparatus obtains an image captured of an area where an object is performing an activity, detects a position of the object present in the area based on the obtained captured image, specifies an action of the object based on the obtained captured image, and outputs information in which a position in the area and an evaluation value are associated with each other, and the information is generated based on the detected position and the specified action, the evaluation value is calculated based on an index value corresponding to the specified action, and a first index value corresponding to a first action and a second index value corresponding to a second action different from the first action are different.

Further features of the present disclosure will become apparent from the following description of exemplary embodiments with reference to the attached drawings.

BRIEF DESCRIPTION OF THE DRAWINGS

FIG. 6 is a diagram illustrating an example of a degree-of-attention update table;

FIG. 13 is a diagram illustrating an example of a degree-of-attention update table;

FIG. 19 is a diagram illustrating an example of allergen holding information;

FIG. 20 is a diagram illustrating an example of a degree-of-attention update table;

FIG. 24 is a diagram illustrating an example of managing information on allergies of persons.

DESCRIPTION OF THE EMBODIMENTS

Details of the technology of the present disclosure will now be described below based on embodiments with reference to the accompanying drawings. Note that the configurations described in the following embodiments are mere examples, and the technology of the present disclosure is not limited to the illustrated configurations.

Embodiment 1

[System Configuration and Hardware Configuration]

Figure 1:
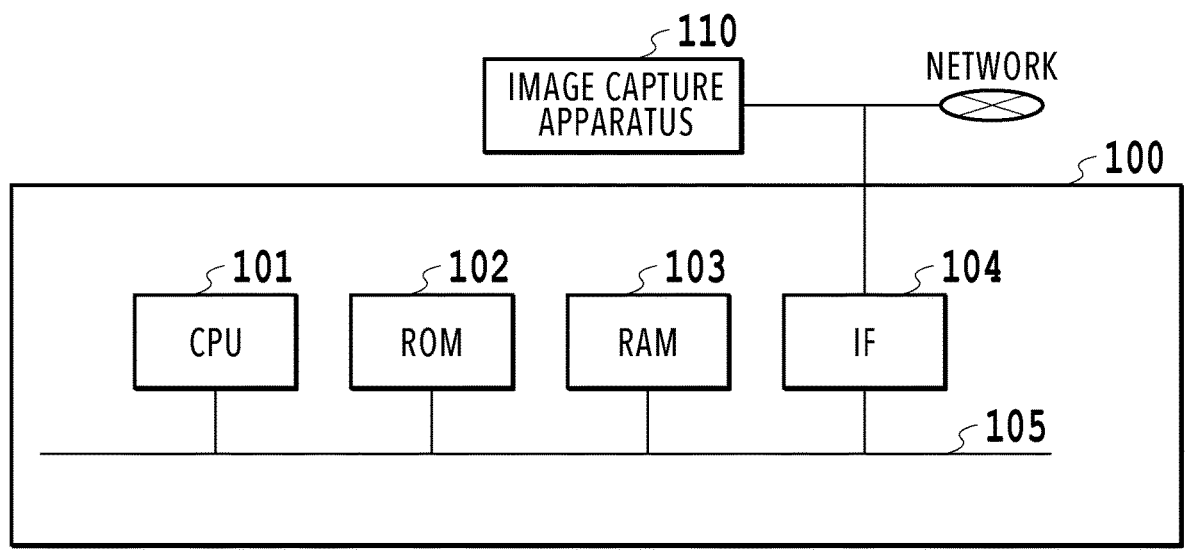
FIG. 1 is a block diagram illustrating a hardware configuration of an information processing apparatus.

FIG. 1 is a block diagram illustrating a system configuration of an attention-required spot detection system and a hardware configuration of an information processing apparatus 100 included in the attention-required spot detection system. In the present embodiment, a description will be given of an attention-required spot detection system for generating information (map) indicating an evaluation value (degree of attention) at each of positions in a predetermined area indicating the degree of attention the user should pay.

The attention-required spot detection system in the present embodiment has an image capture apparatus 110 and an information processing apparatus 100. The image capture apparatus 110 comprises one or more image capture apparatuses. The image capture apparatus 110 captures an image of a target area for generating a degree-of-attention map to be described later and provides the image thus captured to the information processing apparatus 100 via an interface (IF) 104. The present embodiment will be described on the assumption that the image capture apparatus 110 captures a moving image, but the captured image may be still images.

The information processing apparatus 100 has a central processing unit (CPU) 101, a read-only memory (ROM) 102, a random access memory (RAM) 103, and the IF 104, which are connected to one another by a bus 105.

The CPU 101 performs operation control for updating the degree of attention to be described later by following a program stored in the ROM 102 or a program loaded to the RAM 103. The ROM 102 is a read-only memory storing a boot program, firmware, various processing programs and various pieces of data for implementing the processing to be described later. The RAM 103 is a work memory to temporarily store programs or data in order for the CPU 101 to perform processing, and various processing programs or data are loaded to the RAM 103 by the CPU 101.

The information processing apparatus 100 may have one or more dedicated pieces of hardware other than the CPU 101, and at least part of processing by the CPU 101 may be executed by the dedicated pieces of hardware. Examples of the dedicated pieces of hardware include an application-specific integrated circuit (ASIC), a field-programmable gate array (FPGA), a digital signal processor (DSP), and so on.

The IF 104 is an interface for communicating with an external apparatus through a network, and the information processing apparatus 100 can send and receive data through the network.

At least one of a display unit and an operation unit may be connected via the IF 104. The present embodiment will be described on the assumption that at least a display unit 520 (illustrated in FIG. 5) is connected to the information processing apparatus 100. Alternatively, at least one of the display unit 520 and the operation unit (not illustrated) may be present inside the information processing apparatus 100. The CPU 101 also operates as a display control unit that controls the display unit 520 and as an operation control unit that controls the operation unit (not illustrated).

[Installation Example of Image Capture Apparatus]

Figure 2:
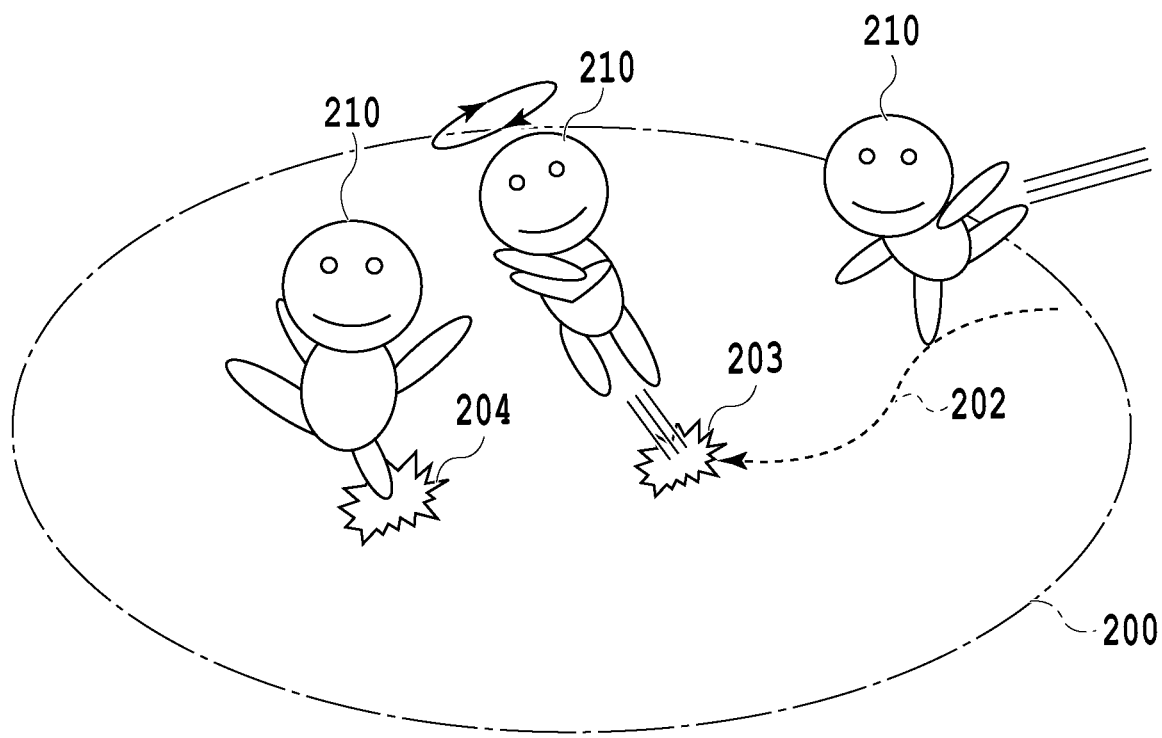
FIG. 2 is a diagram illustrating an example of a target area for generating a degree-of-attention map.

FIG. 2 is a diagram illustrating a skating rink 200 where figure skating competitions are held and where the image capture apparatus 110 of the attention-required spot detection system in the present embodiment captures images.

In sports, such as skating and golf, the field conditions greatly affect performers' and players' performance. There were cases where spots on fields where conditions had badly deteriorated affected performers' and players' performance.

The surface of a field containing water, such as a skating rink, reflects light. Also, the quality (conditions) of the field is greatly affected by the actions which users perform on the field. Thus, due to the nature of the field, it is sometimes difficult to evaluate the quality of the field from a captured image of the field. It is desired that maintenance be performed on spots on the field where the quality has dropped (the conditions have deteriorated) or users of the field use the field so as to avoid the spots where the quality has dropped (the conditions have deteriorated).

In view of such circumstances, the attention-required spot detection system in the present embodiment generates an image. The image capture apparatus 110 is installed such that its angle of view covers the entirety or part of the skating rink 200. A skater 210, who is a user, is skating on the skating rink 200. FIG. 2 illustrates the skater 210 skating, taking off for a toe loop jump, and landing.

Figure 3:
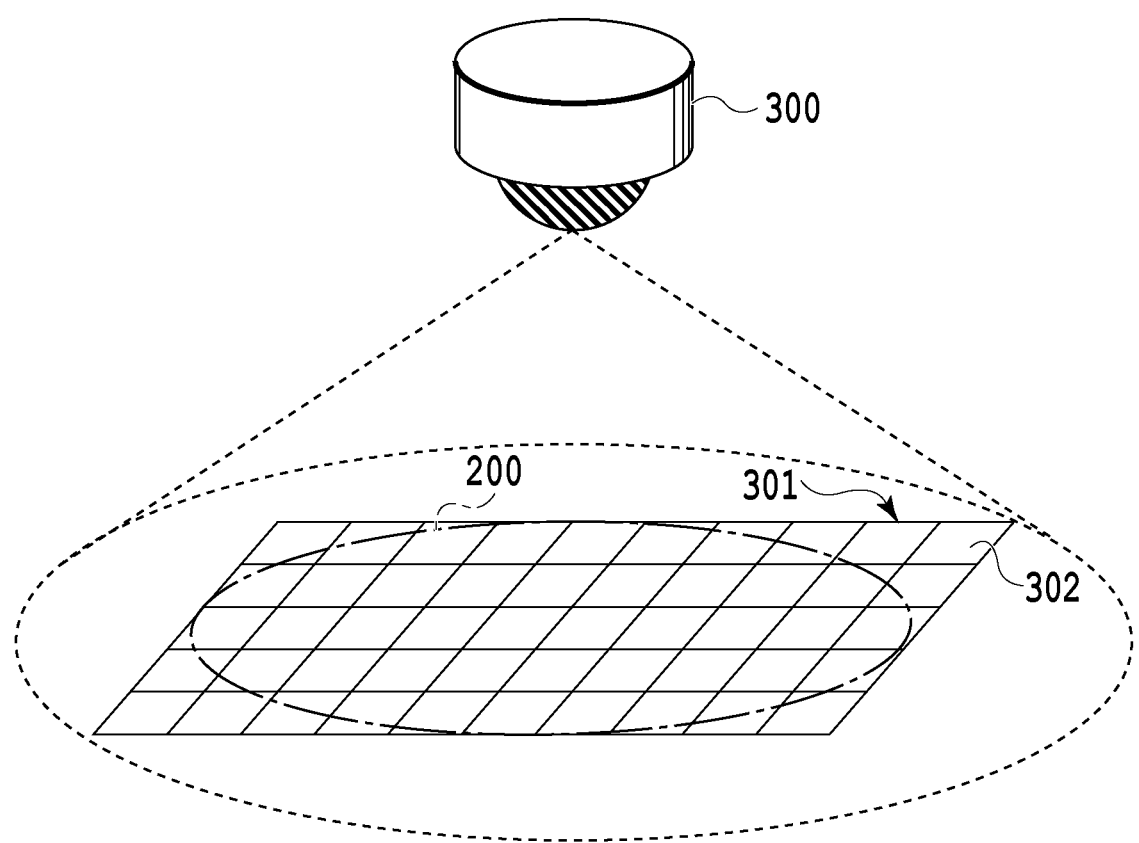
FIG. 3 is a diagram for describing an installation example of an image capture apparatus.

FIG. 3 is a diagram illustrating an arrangement example of the image capture apparatus 110. FIG. 3 illustrates an installation example of an image capture apparatus in a case when the image capture apparatus 110 comprises a single image capture apparatus. As illustrated in FIG. 3, the image capture apparatus 110 is installed as a top camera 300. The top camera 300 is installed on a ceiling, for example, and captures an image of a region covering the skating rink 200 from above.

Figure 4:
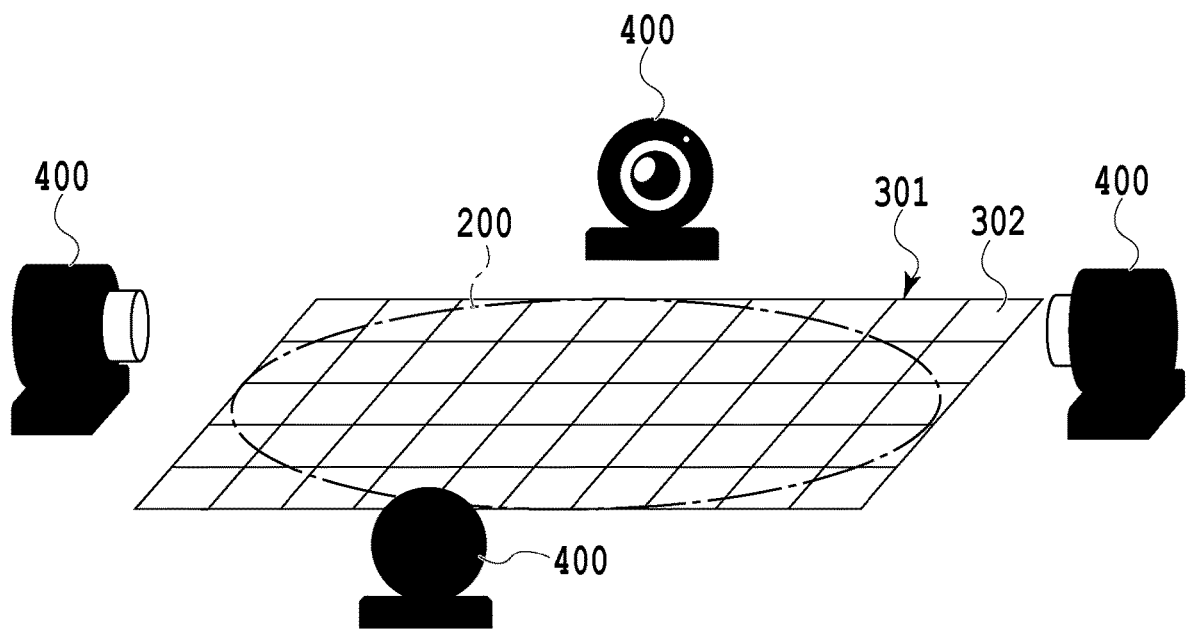
FIG. 4 is a diagram for describing an installation example of image capture apparatuses.

FIG. 4 is a diagram illustrating an installation example of multiple image capture apparatuses in a case when the image capture apparatus 110 comprises multiple video cameras, or the like. The multiple image capture apparatuses 400 are disposed around the skating rink 200. The multiple image capture apparatus 400 are each disposed so as to capture an image of part of the skating rink 200 such that an image capturing the entire skating rink 200 can be obtained with the images captured by all image capture apparatuses 400. The top camera 300 and the multiple image capture apparatuses 400 can be installed together as well.

[Degree-of-Attention Map]

The information processing apparatus 100 in the present embodiment generates a degree-of-attention map indicating information on the degree of attention at each of positions on the skating rink 200. In FIGS. 3 and 4, a degree-of-attention map 301 is depicted over the skating rink 200 for the sake of description. The target area for generating the degree-of-attention map 301 is an area within the image capture range of the image capture apparatus 110, and includes an area where users or caretakers perform activities. For example, the target area for generating the degree-of-attention map 301 is an area including the skating rink 200 where users such as skaters or caretakers such as maintenance workers perform activities. The target area for generating the degree-of-attention map 301 is not limited to the skating rink 200.

The degree-of-attention map 301 is divided into rectangular areas 302 each of which is a section of a predetermined size corresponding to a given position within the degree-of-attention map. A single divided rectangular area 302 is associated with the current degree of attention at that rectangular area. The description will be given on the assumption that the degree of attention is a value indicating the degree of deterioration in conditions at the corresponding position (rectangular area). The degree of attention in the present embodiment is also a value indicating the degree of necessity of maintenance. A higher value of the degree of attention indicates that the conditions of the rectangular area associated with that degree of attention have deteriorated to a greater extent and the degree of attention the user should pay is higher. In other words, a higher degree of attention indicates (represents) a higher degree of necessity of maintenance for the rectangular area associated with that degree of attention. The description will be given on the assumption that the minimum value of the degree of attention is zero and the maximum value is not limited, but the maximum value may be limited.

[Functional Configuration]

Figure 5:
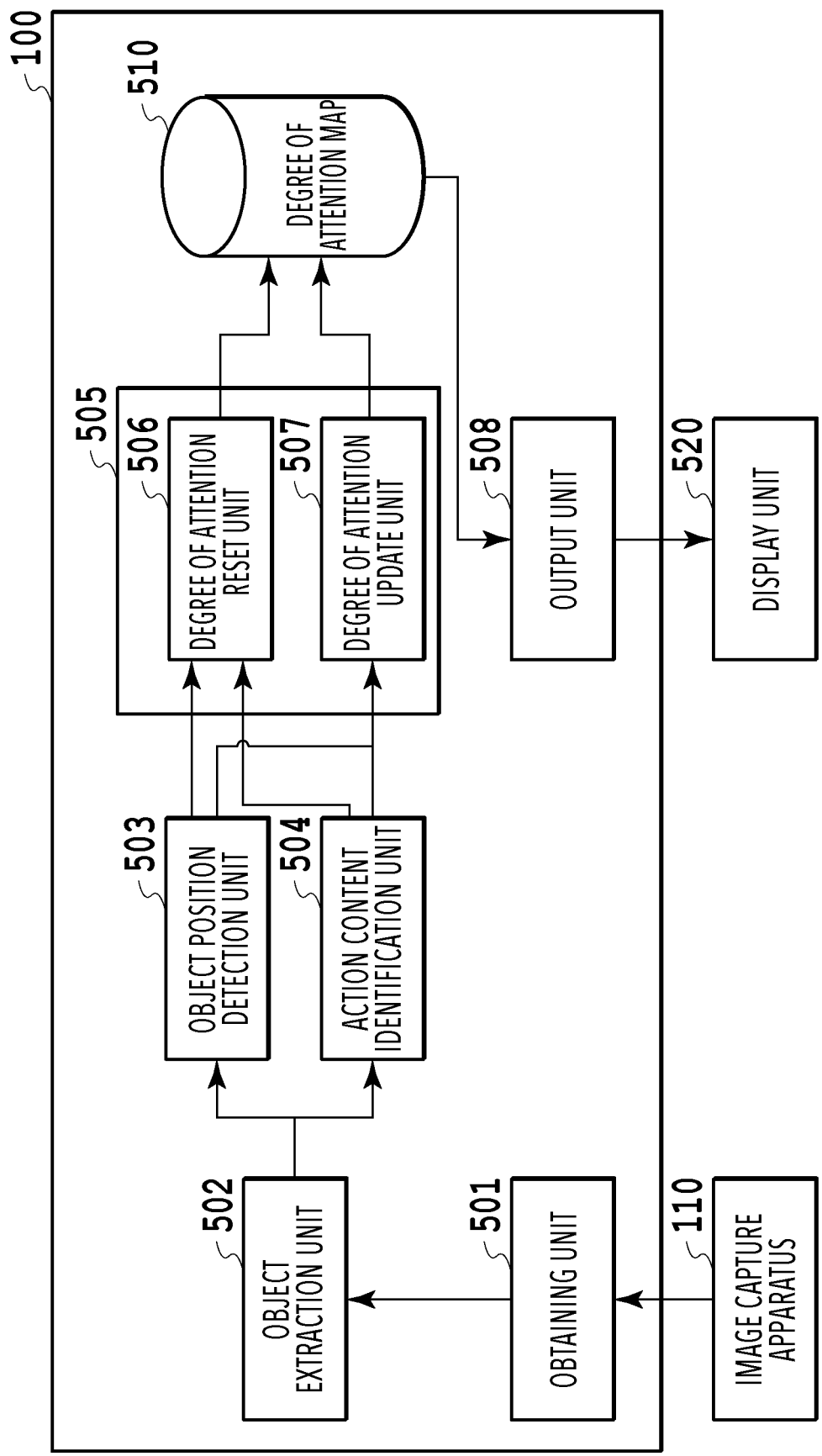
FIG. 5 is a block diagram illustrating an example of a functional configuration of the information processing apparatus.

FIG. 5 is a block diagram illustrating a functional configuration of the information processing apparatus 100. The information processing apparatus 100 has an obtaining unit 501, an object extraction unit 502, an object position detection unit 503, an action content identification unit 504, a degree-of-attention reset unit 506, a degree-of-attention update unit 507, and an output unit 508.

The obtaining unit 501 obtains an image captured by the image capture apparatus 110.

The object extraction unit 502 extracts predesignated targets (objects) from the image captured by the image capture apparatus 110. In a case when the target area for generating the degree-of-attention map 301 is the skating rink 200, as in the present embodiment, the object extraction unit 502 extracts skaters, skating rink maintenance workers, and skating rink maintenance apparatuses as objects. Examples of the method of extracting objects from a captured image include a method in which an object detection process is performed using a trained model generated with deep learning.

In a case when the image capture apparatus 110 comprises the multiple image capture apparatuses 400 as illustrated in FIG. 4, multiple images captured by the image capture apparatuses 400 are gathered at the object extraction unit 502. The object extraction unit 502 executes a process of integrating the multiple captured images and extracting objects from the integrated image.

The object position detection unit 503 detects the positions of the objects extracted by the object extraction unit 502. The object position detection unit 503 detects the positions of the objects on the degree-of-attention map. The trajectories of movement of the objects can be detected by detecting the positions of the objects at intervals of a predetermined time.

A method of detecting the positions of the objects include, for example, using a camera capable of measuring the distances to objects with infrared light beams or the like to identify objects within its image capture range, and detecting the contact points between the identified objects and the ground surface as the positions of the objects, or associating positions in the image captured by the image capture apparatus 110 and positions on the degree-of-attention map with one another and detecting the positions of the objects on the degree-of-attention map from the positions of the objects in the captured image.

The size of each rectangular area 302 in the degree-of-attention map 301 is dependent on the position recognition accuracy of the object position detection unit 503. The higher the position recognition accuracy of the object position detection unit 503 is, the smaller the size of each rectangular area 302 in the degree-of-attention map 301 can be.

The action content identification unit 504 identifies (specifies) the contents of actions performed by the objects extracted by the object extraction unit 502 at the positions detected by the object position detection unit 503. This process can be implemented by using a deep learning technology, for example. Specifically, a trained model is generated by performing supervised machine learning that handles an image of an object as an input and the content of an action as an output and gives the content of an actual action indicated by an input image as correct data by means of deep learning. Then, based on outputs obtained by inputting images of the objects cut out of the captured image into the generated trained model, the action content identification unit 504 identifies the contents of the actions of the objects at their positions.

The degree-of-attention update unit 507 determines values (update values or index values) for updating the degree of attention corresponding to the contents of the actions identified by the action content identification unit 504 by using a degree-of-attention update table.

FIG. 6 is a diagram illustrating an example of the degree-of-attention update table. A degree-of-attention update table 600 in FIG. 6 holds the contents of actions of objects and values for updating the degree of attention in association with one another. The degree-of-attention update table 600 in FIG. 6 is a degree-of-attention update table generated in the case when the target area for generating the degree-of-attention map 301 is the skating rink 200.

A column 601 in the degree-of-attention update table 600 holds the contents of actions identifiable by the action content identification unit 504. The degree-of-attention update table 600 in FIG. 6 is generated in order to update the degrees of attention in the degree-of-attention map for the skating rink, and holds the contents of actions which objects detected on the skating rink are likely to perform as the contents of actions of objects. The action content identification unit 504 identifies the contents of the actions of the objects by using a trained model trained to output the contents of the actions held in the column 601 in the degree-of-attention update table 600.

A column 602 in the degree-of-attention update table 600 holds values for updating the degree of attention, the values corresponding to the contents of the actions in the column 601. In the present embodiment, a higher value of the degree of attention indicates a higher degree of necessity of maintenance for the skating rink. Thus, in a case when the content of the action of an object is other than activities related to maintenance, a positive value is associated with the content of the action. Also, the values held in the column 602 are such that a large positive value is associated with an activity that is likely to make a hole or a scratch in the rink.

The degree-of-attention update unit 507 updates the degrees of attention at the positions on the degree-of-attention map detected by the object position detection unit 503. Specifically, the degree-of-attention update unit 507 adds the current values of the degrees of attention at the positions of the objects (rectangular areas) detected by the object position detection unit 503 and the values in FIG. 6 corresponding to the contents of the actions of the objects to one another. The degree-of-attention update unit 507 then updates the degrees of attention at the positions (rectangular areas) detected by the object position detection unit 503 to the respective added values.

The degree-of-attention reset unit 506 resets the degree of attention in the degree-of-attention map to zero. The degree-of-attention update table 600 in FIG. 6 includes an entry "rink maintenance" as the content of an action, as illustrated in a row 603. "Rink maintenance" is a reset action, and a value "reset" as an instruction to set the value of the degree of attention in the degree-of-attention map 301 to zero is associated with "rink maintenance" as a value for updating the degree of attention. In a case when a value determined by the degree-of-attention update unit 507 is "reset", the degree-of-attention reset unit 506 resets the degree of attention in the degree-of-attention map associated with the corresponding position detected by the object position detection unit 503 to zero. The degree-of-attention update unit 507 and the degree-of-attention reset unit 506 may be referred to collectively as "degree-of-attention map management unit 505".

The degree-of-attention map after the update of the degree of attention is stored in a storage unit 510 of the attention-required spot detection system. The storage unit 510 storing the degree-of-attention map may be a storage unit outside the information processing apparatus 100 or a storage unit such as the ROM 102 in the information processing apparatus 100.

The output unit 508 outputs the degree-of-attention map stored in the storage unit 510 of the attention-required spot detection system via the IF 104 such that the degree-of-attention map can be displayed on the display unit 520.

The CPU 101 of the information processing apparatus 100 implements the functional components in the information processing apparatus 100 in FIG. 5 by executing a predetermined program, but the present embodiment is not limited to this manner. In another example, hardware such as a graphics processing unit (GPU) or an FPGA (not illustrated) may be used. Each functional component may be implemented by software and hardware, such as a dedicated integrated circuit (IC), cooperating with each other, or some or all of the functions may be implemented solely with hardware.

[Flowchart]

Figure 7:
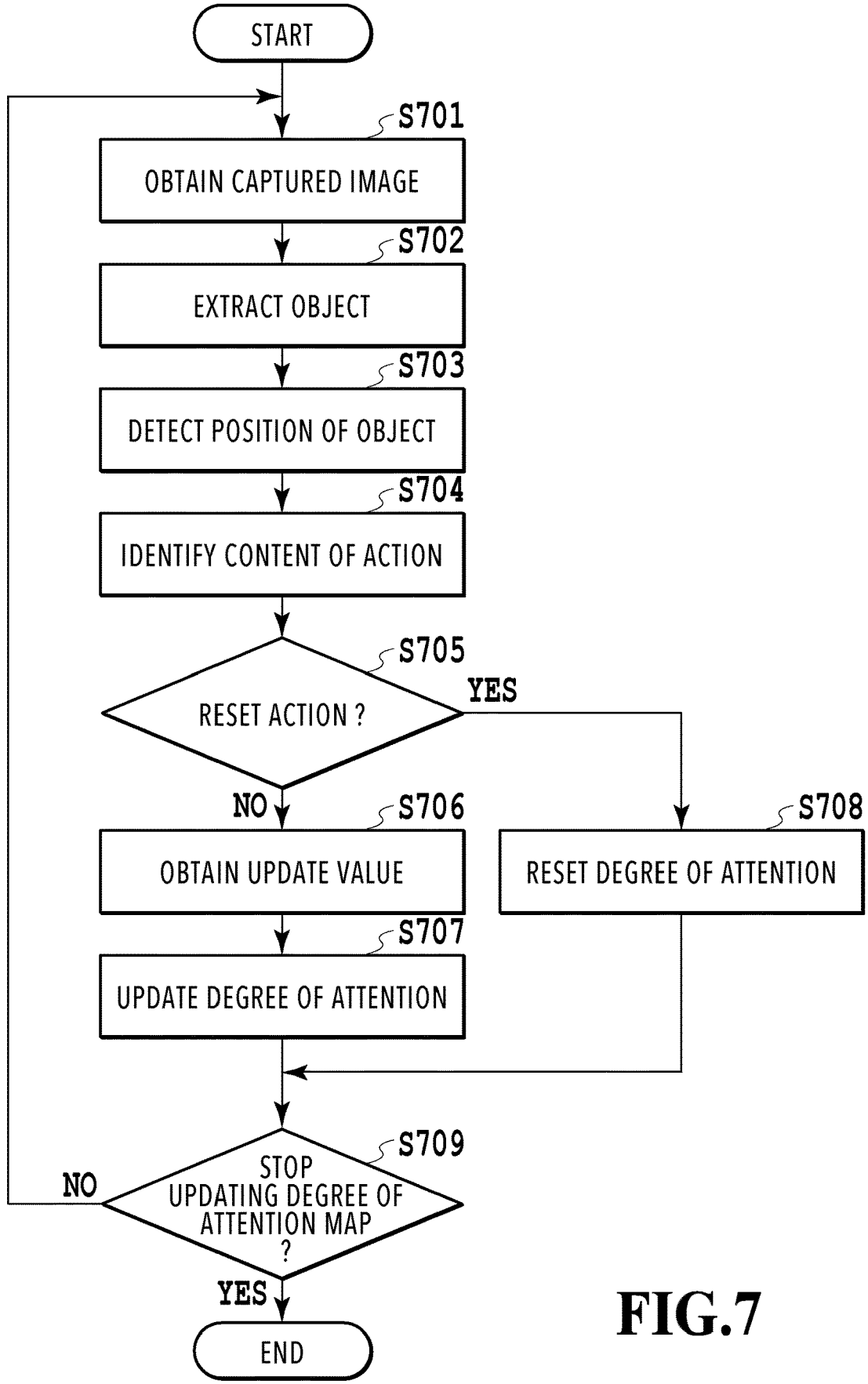
FIG. 7 is a flowchart for describing an example of processing in a process of updating the degree of attention.

FIG. 7 is a flowchart illustrating a processing procedure for updating the degree of attention in the degree-of-attention map by the information processing apparatus 100. The CPU of the information processing apparatus 100 performs the series of processes illustrated in the flowchart of FIG. 7 by loading program code stored in the ROM to the RAM and executing it. Also, the functions of some or all of the steps in FIG. 7 may be implemented with hardware such as an ASIC or an electronic circuit. Meanwhile, the symbol "S" in the description of each process means a step in the flowchart. This applied also to the subsequent flowchart.

In S701, the obtaining unit 501 obtains an image captured by the image capture apparatus 110. In the case when the image capture apparatus 110 has captured a moving image, the obtaining unit 501 obtains an image of one frame, for example. The obtaining unit 501 may obtain images of several frames.

In S702, the object extraction unit 502 extracts an object included in the captured image obtained in S701. If the object extraction unit 502 cannot extract an object from the captured image, the processing returns to S701 to obtain an image captured at the next time. S701 and S702 are repeated until an object is extracted.

In S703, the object position detection unit 503 detects the position of the object extracted in S702 on the degree-of-attention map 301, the position being one at the time of the image capture.

In S704, the action content identification unit 504 identifies (specifies) the content of the action of the object extracted in S702. The action content identification unit 504 identifies the content of the action from among the contents of actions included in the degree-of-attention update table 600. In S704, the action content identification unit 504 identifies the content of the activity of the object extracted in S702 at the position detected in S703.

In S705, the degree-of-attention reset unit 506 determines whether the content of the action identified in S704 is a reset action. As mentioned earlier, the reset action in the present embodiment is "rink maintenance".

If the identified action is not determined to be the reset action (NO in S705), the processing shifts to S706. In S706, the degree-of-attention update unit 507 obtains the value in the degree-of-attention update table 600 in FIG. 6 associated with the content of the action identified in S704.

The processing then proceeds to S707, in which the degree-of-attention update unit 507 adds the value obtained in S706 to the degree of attention at the rectangular area in the degree-of-attention map covering the position detected in S703. The degree-of-attention update unit 507 then updates the degree of attention at the rectangular area in the degree-of-attention map covering the position detected in S703 to the added value.

If, on the other hand, the identified action is determined to be the reset action (YES in S705), the processing shifts to S708. In S708, the degree-of-attention reset unit 506 resets the value of the degree of attention at the rectangular area in the degree-of-attention map 301 covering the position detected in S703. Specifically, the degree-of-attention reset unit 506 sets the evaluation value associated with the rectangular area in the degree-of-attention map 301 to zero.

After S707 or S708, the degree-of-attention map 301 is updated so as to indicate the degree of necessity for maintenance at each position on the skating rink 200. The processes in S701 to 708 are repeated until an instruction to stop updating the degree-of-attention map is received from the user. That is, the processing returns to S701 after completing S707 or S708. After returning to S701 and obtaining an image (frame) captured at the next time, S702 to S708 are performed. If, on the other hand, an instruction to stop updating the degree-of-attention map is received from the user due to performing maintenance, stopping the operation, or the like (YES in S709), the flowchart ends.

[Degree-of-attention map Output as Result of Processing]

Figure 8:
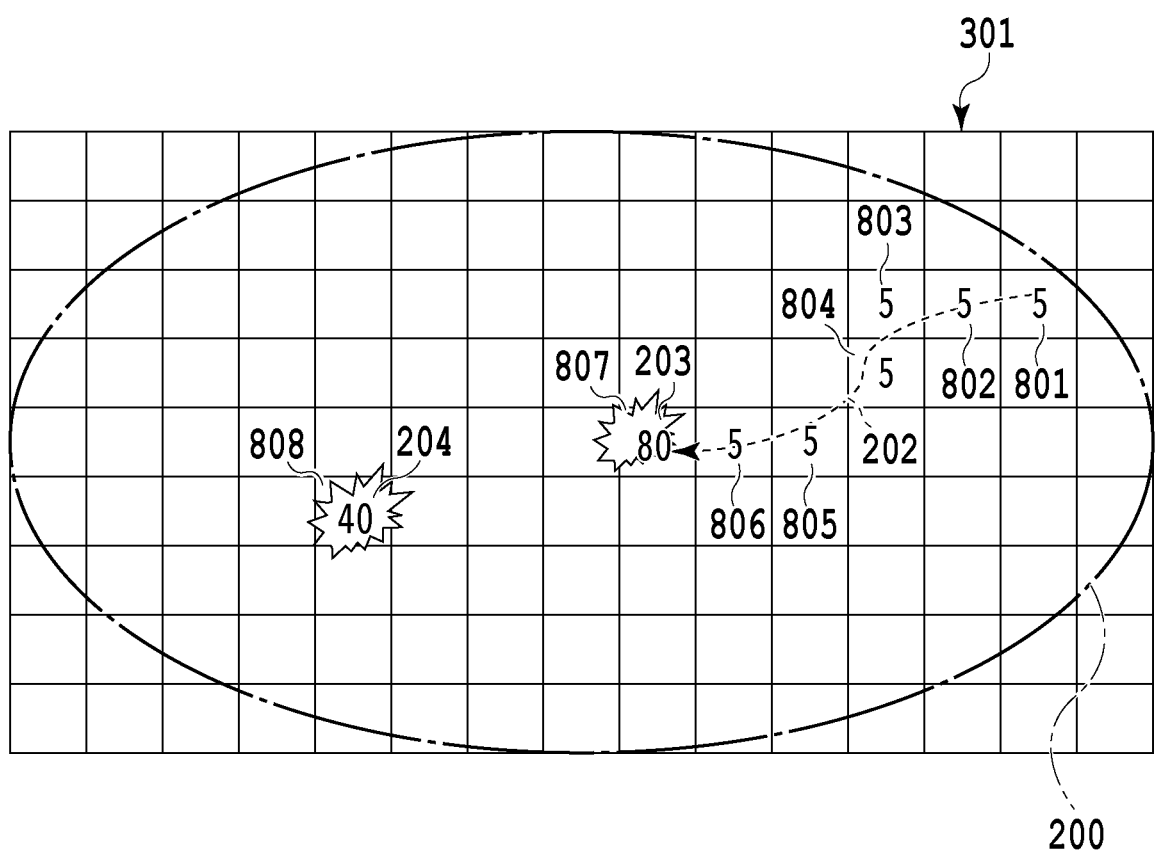
FIG. 8 is a diagram illustrating an example of the degree-of-attention map after updating the degree of attention.

FIG. 8 is a diagram illustrating an example of the degree-of-attention map generated (updated) by executing the flowchart of FIG. 7. The degree-of-attention map 301 in FIG. 8 is a degree-of-attention map updated and generated based on images (frames) captured at multiple times by the image capture apparatus 110 in a time period in which the skater 210 was skating on the skating rink 200 as illustrated in FIG. 2.

The numbers inside some rectangular areas obtained by dividing the degree-of-attention map 301 in FIG. 8 are values indicating the degrees of attention associated with the rectangular areas, and represent the degrees of attention updated by repeating executing the flowchart of FIG. 7. In FIG. 8, the rectangular areas with a degree of attention of zero do not show a value indicating that degree of attention.

Suppose that, on the skating rink 200 in FIG. 2, the skater 210 skated along a skating trajectory 202, took off for a toe loop jump at a toe loop jump takeoff position 203, and landed at a jump landing position 204. From images captured by the image capture apparatus 110 at times in the time period in which the skater 210 skated, the action content identification unit 504 identifies the content of the action of the skater 210 at each of these times.

As illustrated in FIG. 8, as a result of the object position detection unit 503 detecting the position of the object, the position of the skating trajectory 202, the toe loop jump takeoff position 203, and the jump landing position 204 on the degree-of-attention map 301 are detected. Suppose that the degree of attention before the skating was zero at all rectangular areas.

In FIG. 8, the value "5" in the degree-of-attention update table 600 associated with "skating" is added to the degrees of attention at rectangular areas 801 to 806 covering the position of the skating trajectory 202. Accordingly, the degree-of-attention map 301 is updated such that "5" is simply associated with the rectangular areas 801 to 806 as the corresponding degrees of attention.

Similarly, the value "80" in the degree-of-attention update table 600 associated with "toe loop jump" is added to the degree of attention at a rectangular area 807 in the degree-of-attention map covering the toe loop jump takeoff position 203. Accordingly, the degree-of-attention map 301 is updated such that "80" is simply associated with the rectangular area 807 as the corresponding degree of attention.

Moreover, the value "40" in the degree-of-attention update table 600 associated with "jump landing" is added to the degree of attention at a rectangular area 808 in the degree-of-attention map covering the jump landing position 204. Accordingly, the degree-of-attention map 301 is updated such that "40" is simply associated with the rectangular area 808 as the corresponding degree of attention.

In a case when the user is a skater who uses the skating rink 200, the user can use the skating rink 200 so as to avoid spots of the skating rink 200 where the degree of attention is high. In a case when the user is a caretaker of the skating rink 200, the user can instruct a maintenance worker to perform maintenance on spots where the degree of attention is higher than a predetermined value. A maintenance apparatus configured to be capable of receiving the degree-of-attention map 301 may automatically perform maintenance on areas in the degree-of-attention map 301 where the degree of attention is higher than a threshold value.

Figure 9:
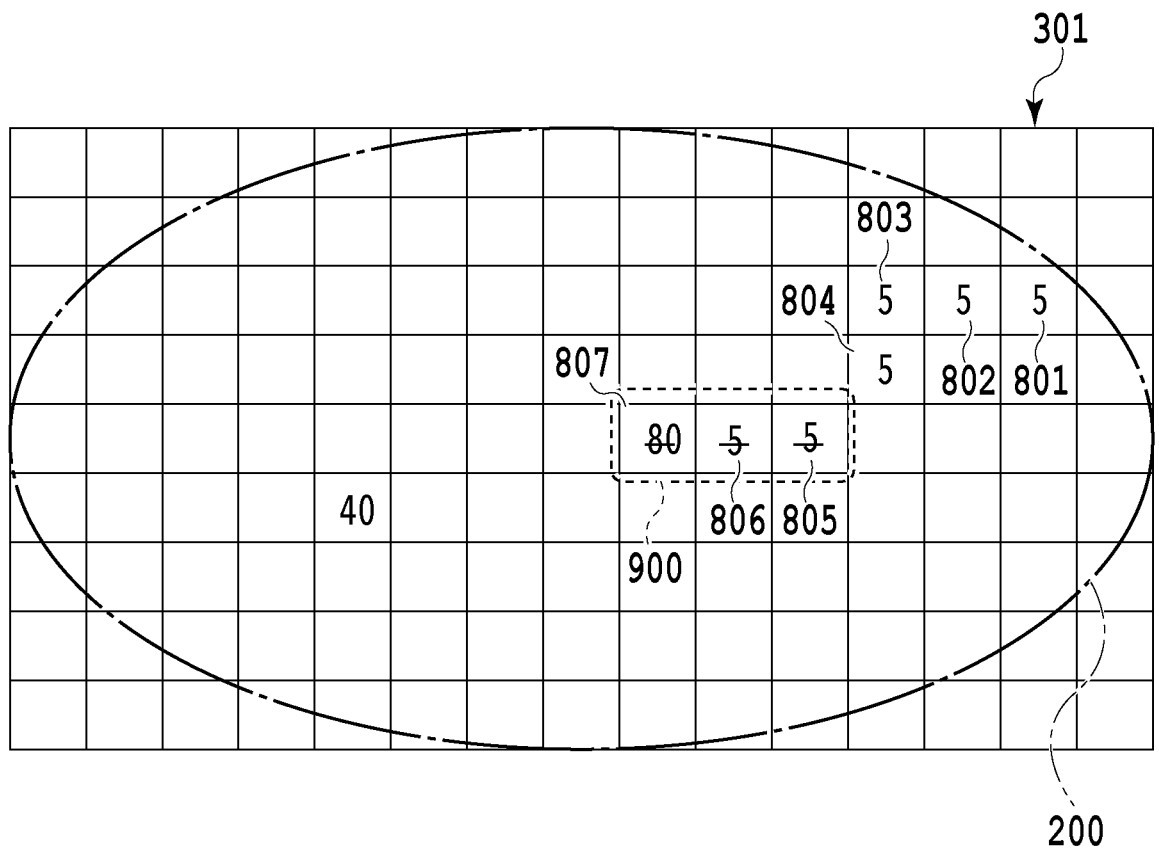
FIG. 9 is a diagram illustrating an example of the degree-of-attention map updated as a result of a rink maintenance action.

FIG. 9 is a diagram illustrating the degree-of-attention map 301 output after performing maintenance on the skating rink 200 in the conditions indicated by the degree-of-attention map 301 in FIG. 8. Specifically, it is a degree-of-attention map generated by updating the degrees of attention at some rectangular areas based on images (frames) captured by the image capture apparatus 110 at times in a time period in which a maintenance worker or a maintenance apparatus performed maintenance on the skating rink 200 in FIG. 2. A region 900 surrounded by a dotted line is a region where the position of a maintenance worker or maintenance apparatus, i.e., an object, was detected and where the maintenance worker or maintenance apparatus has been identified to have performed rink maintenance. The region 900 includes the rectangular areas 805 and 806 covering the position of the skating trajectory 202 and the rectangular region 807 covering the toe loop jump takeoff position 203, and the degrees of attention associated with the rectangular areas 805 to 807 have been updated to zero.

Figure 10:
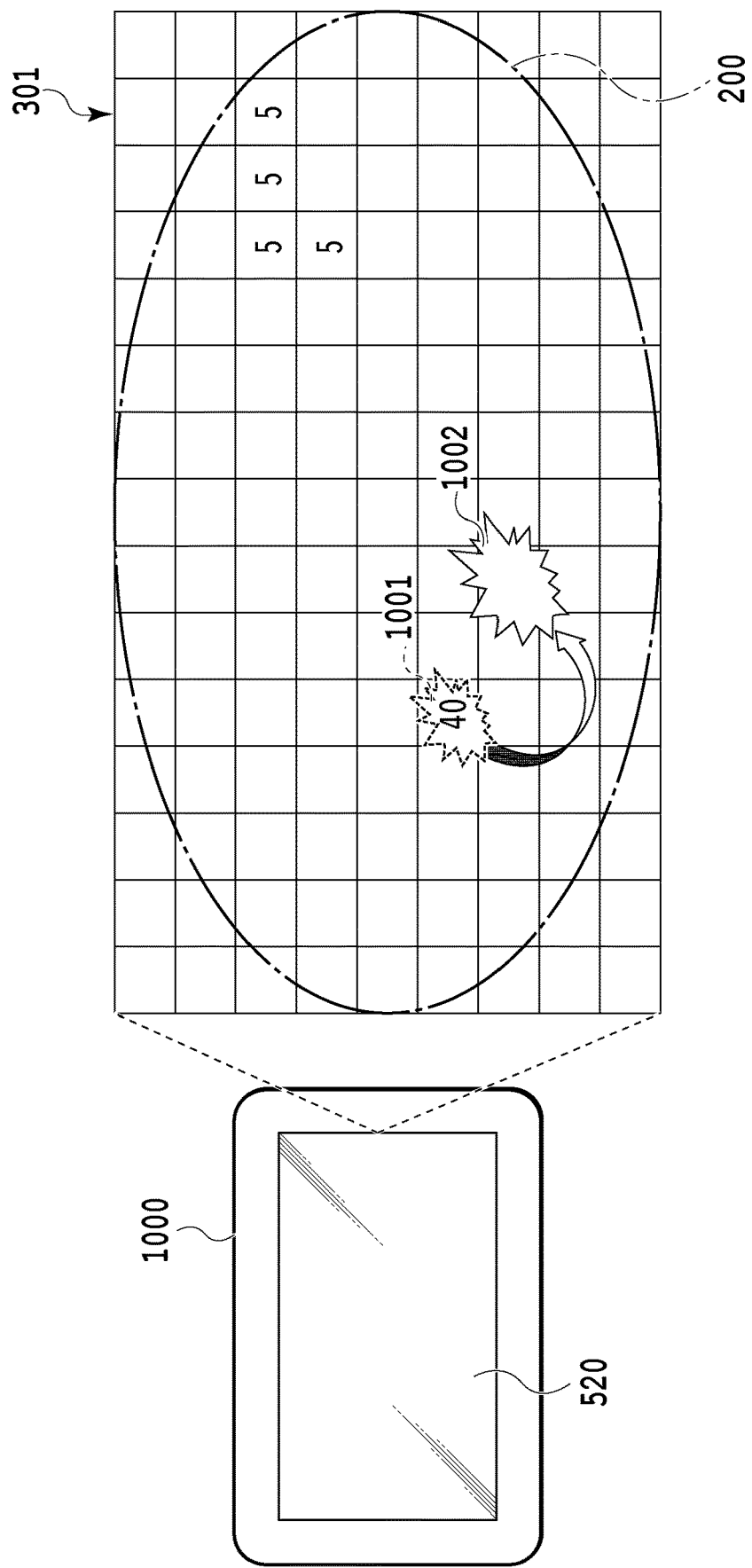
FIG. 10 is a diagram for describing an example of a method of utilizing the degree-of-attention map.

FIG. 10 is a diagram for describing a specific use example of a degree-of-attention map using the display unit 520. A use example of a degree-of-attention map in a case where the user is a user of the skating rink 200 (a skater or a coach) will be described with reference to FIG. 10.

A planned jump takeoff point 1001 represents a jump takeoff point that the user has originally planned to use. The user can check the current degree of attention at the planned jump takeoff point 1001 by using a map viewing device 1000 that has the display unit 520 and allows the user to view the degree-of-attention map 301.

By checking the degree-of-attention map 301, the user can confirm before starting skating that the degree of attention is high and the conditions are therefore poor at the current planned jump takeoff point 1001. This allows the user to change the skating plan by, for example, changing the planned jump takeoff point to a different planned jump takeoff point 1002, in advance. Thus, according to the present embodiment, it is possible to reduce the impact of the quality of a field on a performer's or a player's performance by viewing the degree-of-attention map 301.

Figure 11:
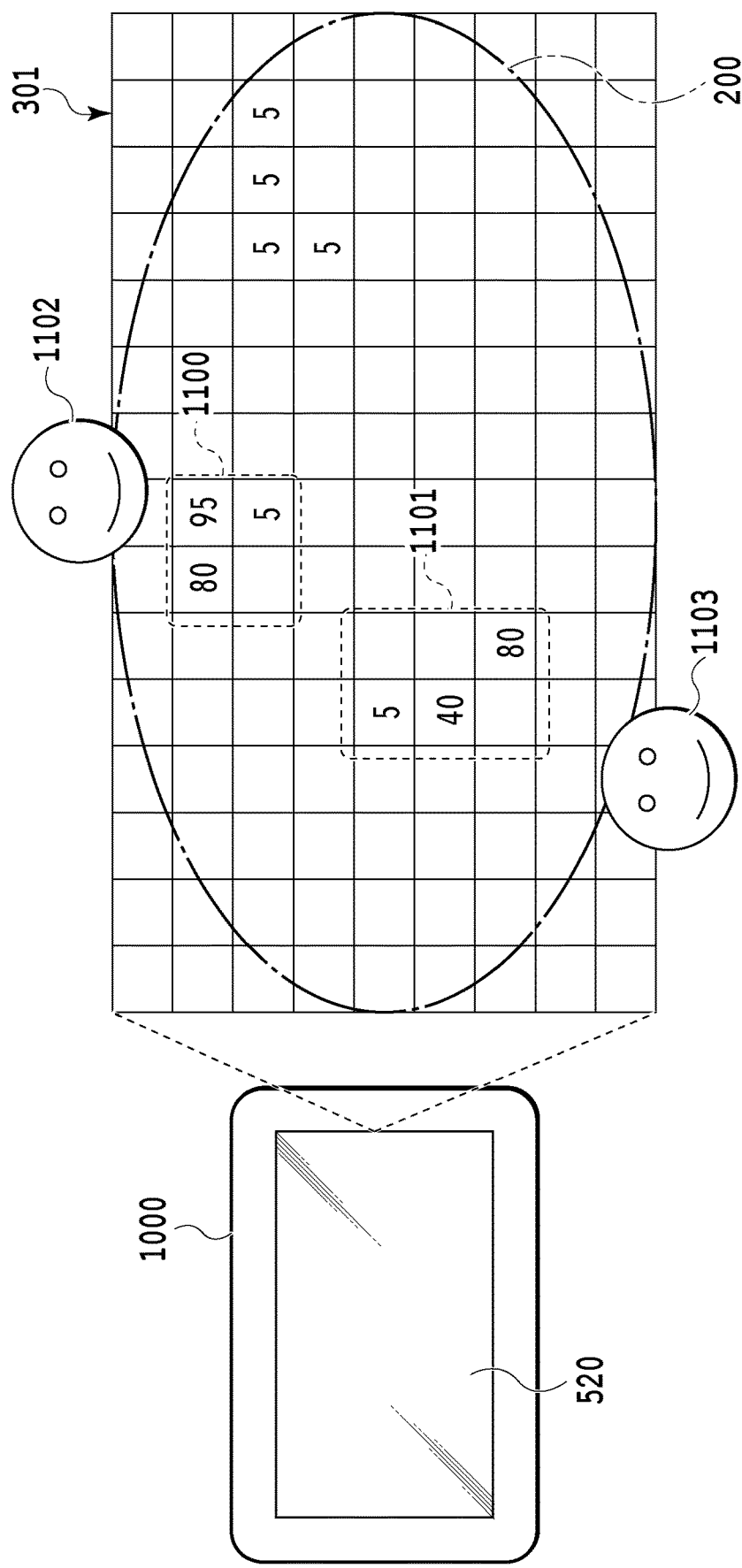
FIG. 11 is a diagram for describing an example of the method of utilizing the degree-of-attention map.

FIG. 11 is a diagram for describing a use example of the degree-of-attention map 301 in a case when the user is a caretaker of the skating rink 200. Planned maintenance regions 1100 and 1101 surrounded by dotted lines are regions where maintenance workers or maintenance apparatuses 1102 and 1103 are to perform maintenance, the regions being determined by the user using the degree-of-attention map 301. By using the map viewing device 1000, the user can determine a maintenance plan such that the planned maintenance regions 1100 and 1101 will be areas in the degree-of-attention map 301 including spots where the degree of attention is higher than a threshold value.

As described above, according to the present embodiment, it is possible to determine maintenance regions in advance. Hence, the user can fix holes or scratches in the skating rink made by jumps, or the like, within a short time period such as a time period for switching the performer in a figure skating competition. Moreover, the user can check the current degree-of-attention map 301 after the maintenance to check whether there is any spot where the maintenance was forgotten to be performed. As described above, the user can see spots where the degree of attention is high as spots in need of intensive maintenance and perform maintenance preferentially on the spots where the degree of attention is high.

Embodiment 2

Embodiment 1 has been described on the assumption that the target area for generating a degree-of-attention map is a skating rink. As with skating rinks, conditions of a field with grass, such as a soccer or golf field, cannot be properly evaluated by simply viewing the field. In Embodiment 2, an attention-required spot detection system that handles a golf field as a target area for generating a degree-of-attention map will be described. In the present embodiment, its difference from Embodiment 1 will be mainly described. Features that are not particularly specified are the same components and processes as those in Embodiment 1.

Figure 12:
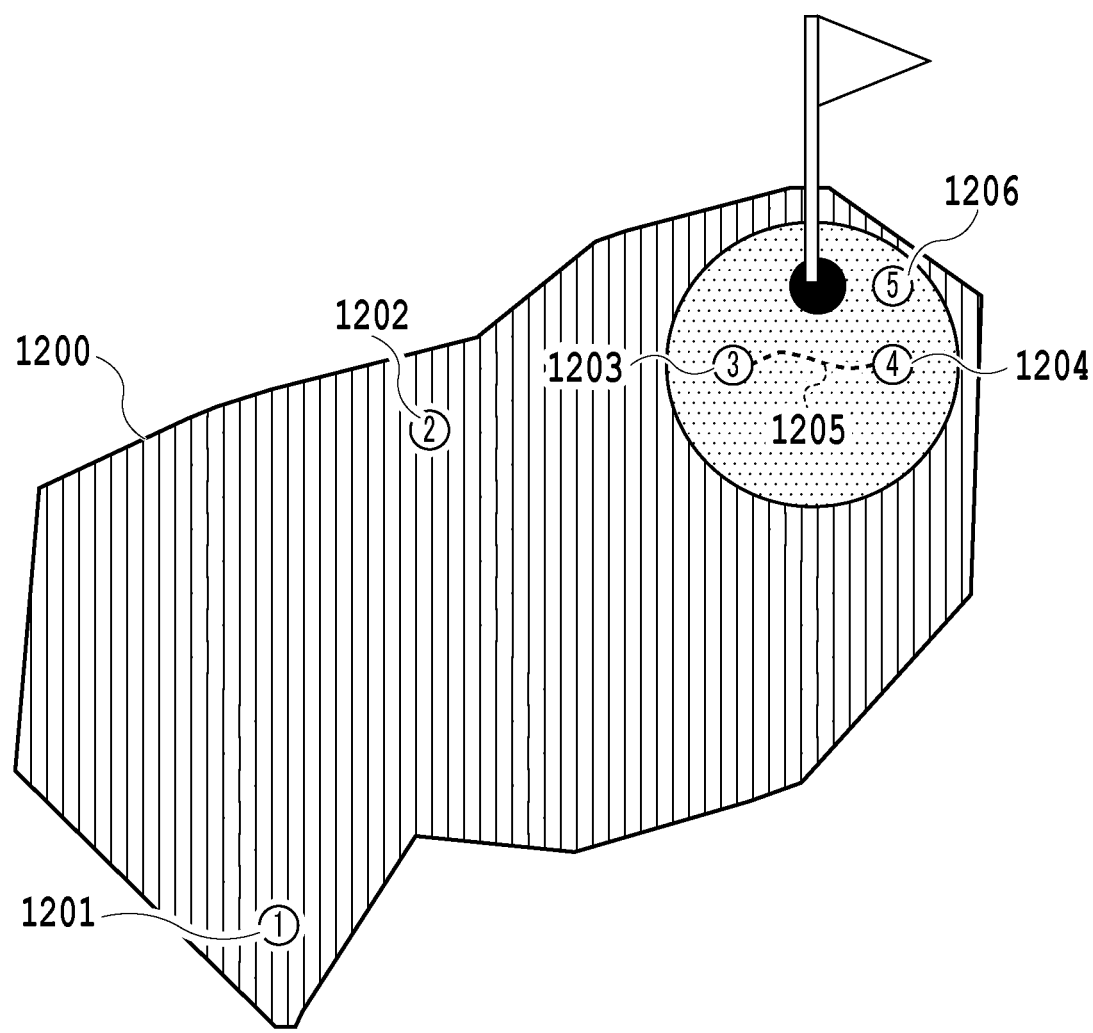
FIG. 12 is a diagram illustrating an example of a target area for generating a degree-of-attention map.

FIG. 12 is a diagram illustrating a golf field 1200 where the image capture apparatus 110 of the attention-required spot detection system in the present embodiment captures images. The golf field 1200 in FIG. 12 is an entire hole in a golf course, which is the target area for generating a degree-of-attention map to be output in the present embodiment. The installation position of the image capture apparatus 110 is determined such that its angle of view covers the entirety or part of the golf field 1200. To cover a large area like a golf field, it is preferable to employ the configuration and arrangement of the multiple image capture apparatuses illustrated in FIG. 4 as the image capture apparatus 110.

FIG. 13 is a diagram illustrating an example of the degree-of-attention update table in the present embodiment. The degree-of-attention update table 1300 in FIG. 13 is a degree-of-attention update table generated in the case when the target area for generating the degree-of-attention map is a golf field. In the degree-of-attention update table 1300 in FIG. 13, the contents of actions of objects in a golf field and values for updating the degree of attention are associated with one another.

The contents of actions held in a column 1301 in the degree-of-attention update table 1300 in FIG. 13 are the contents of activities that objects detected on the golf field 1200 are likely to perform. The action content identification unit 504 in the present embodiment identifies the contents of actions of the objects by using a model trained to output the contents of the actions held in the column 1301 in the degree-of-attention update table 1300.

In the present embodiment, in a case when the content of an action is related to maintenance, a negative value is associated with the content of that action as a value for updating the degree of attention. In a case when adding the negative value results in a negative value, the degree of attention will be updated to a minimum value of zero.

As the content of an action in a row 1303, "not used for 1 day" is held, and a negative value is associated with the content of the action as a value for updating the degree of attention. For each rectangular area in the degree-of-attention map, the degree-of-attention update unit 507 in the present embodiment calculates the length of time for which no object was present in the rectangular area. In a case when the length of time for which no object was present in a rectangular area reaches one day, the degree-of-attention update unit 507 adds a negative value "−10" to the degree of attention at that rectangular area to update it.

[Degree-of-Attention Map Output as Result of Processing]

Figure 14:
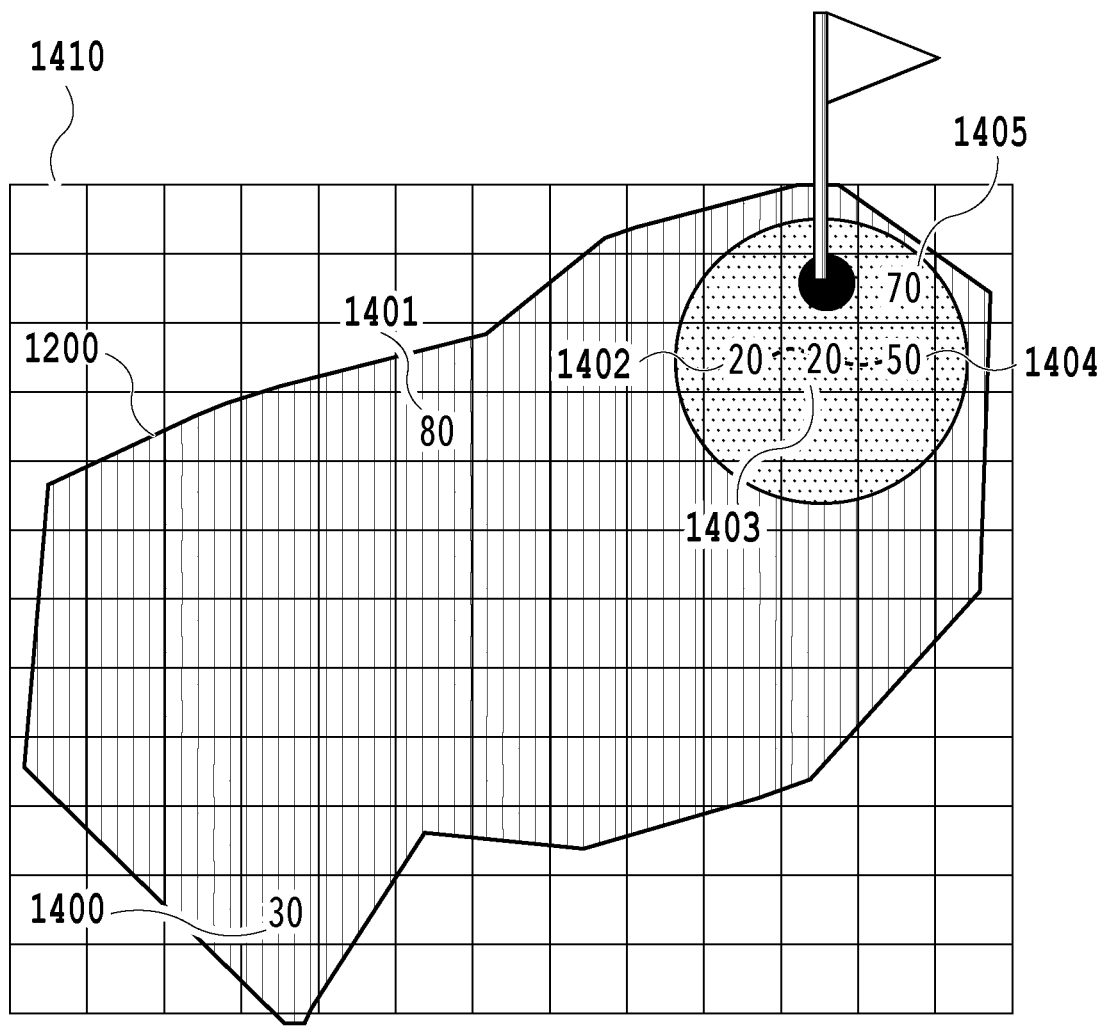
FIG. 14 is a diagram illustrating an example of the degree-of-attention map after updating the degree of attention.

FIG. 14 is a diagram illustrating an example of the degree-of-attention map in the present embodiment generated (updated) by executing the flowchart of FIG. 7. Note that the degree-of-attention update table 1300 in the present embodiment includes no reset action, and therefore S705 in FIG. 7 may be skipped to S706. Also, in parallel with the flowchart of FIG. 7, the length of time for which no object was present is calculated for each rectangular area forming a degree-of-attention map 1410, and the degree of attention at the rectangular area is updated according to the calculated length of time.

The degree-of-attention map 1410 in FIG. 14 is a degree-of-attention map generated by updating the degrees of attention at some rectangular areas based on images (frames) captured by the image capture apparatus 110 at times in a time period in which a user played golf on the golf field 1200 in FIG. 12.

Suppose that, on the golf field 1200 in FIG. 12, the user hit a driver shot at a driver shot point 1201 and hit an iron shot at an iron shot point 1202. Suppose also that the user started running at a running start point 1203 on the green and ran along a running path 1205 on the green. Suppose also that the user hit a putter shot at a putter shot point 1204 and jumped at a jump point 1206 on the green.

From images captured by the image capture apparatus 110 at times in the time period in which the user played golf, the action content identification unit 504 identifies the content of the action of the user at each of these times. The degree-of-attention update unit 507 then uses the degree-of-attention update table 1300 in FIG. 13 to determine the values associated with the contents of the actions thus identified, and updates the degree of attention to thereby generate the degree-of-attention map 1410 illustrated in FIG. 14.

In the degree-of-attention map 1410 in FIG. 14, the value "30" in the degree-of-attention update table 1300 associated with "other shots" is added to the degree of attention at a rectangular area 1400 covering the driver shot point 1201. Accordingly, the degree-of-attention map 1410 is updated such that "30" is simply associated with the rectangular area 1400 as the corresponding degree of attention.

Similarly, the value "80" in the degree-of-attention update table 1300 associated with "iron shot" is added to the degree of attention at a rectangular area 1401 covering the iron shot point 1202. Accordingly, the degree-of-attention map 1410 is updated such that "80" is simply associated with the rectangular area 1401 as the corresponding degree of attention.

Moreover, the value "20" in the degree-of-attention update table 1300 associated with "running on green" is added to the degree of attention at each of rectangular areas 1402 to 1404 covering the position of the running path 1205 on the green. Moreover, the value "30" in the degree-of-attention update table 1300 associated with "other shots" is added to the degree of attention at the rectangular area 1404 in the degree-of-attention map covering the putter shot point 1204. The value of the degree of attention at the rectangular area 1404 before being updated is "20". Thus, the degree-of-attention update unit 507 adds "30" to "20", which is the current degree of attention at the rectangular area 1404. The resulting value "50" after the update is associated as the degree of attention at the rectangular area 1404.

The value "70" in the degree-of-attention update table 1300 associated with "jumping on green" is added to the degree of attention at a rectangular area 1405 covering the jump point 1206 on the green. In this way, according to Embodiment 2, it is possible to indicate spots in a golf field in need of lawn maintenance based on the positions of users' activities in the golf field and the contents of the actions.

Figure 15:
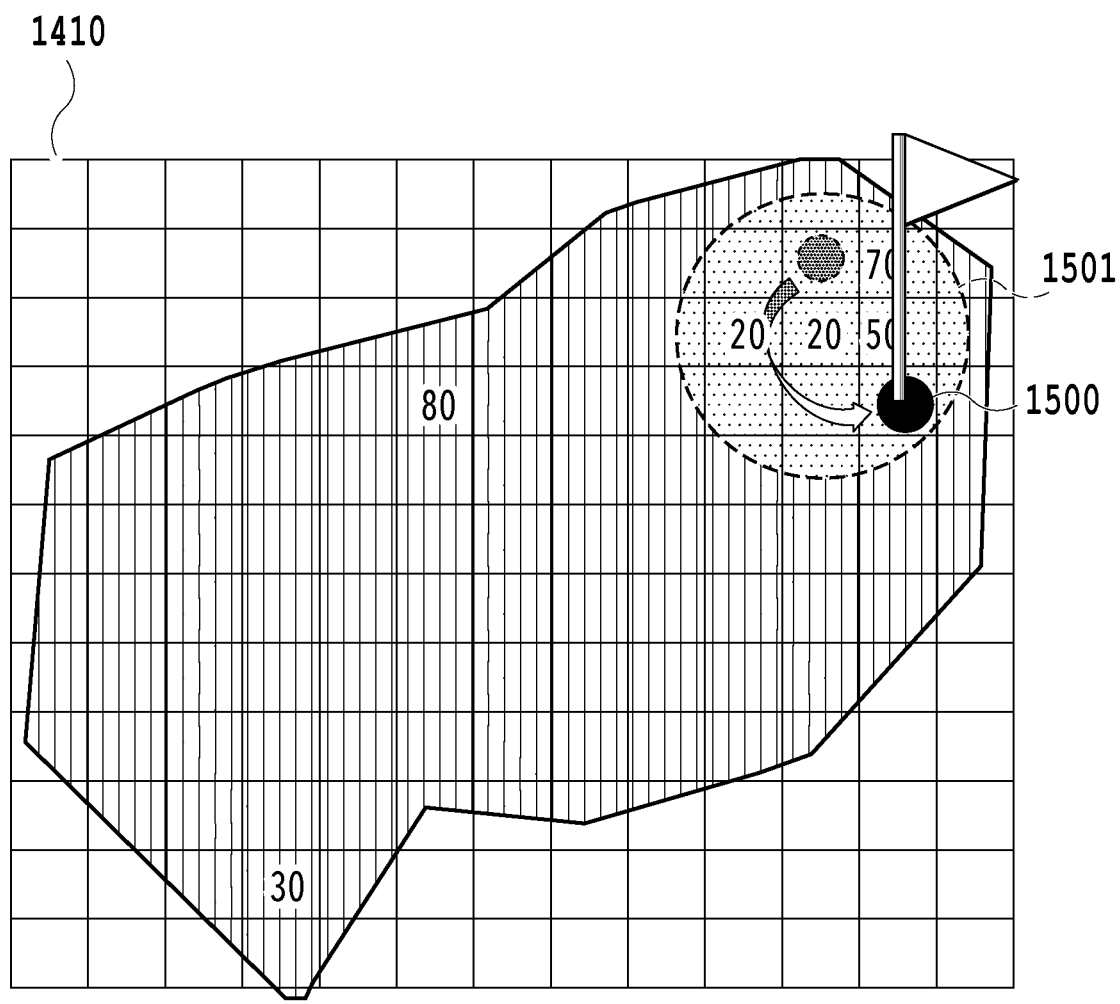
FIG. 15 is a diagram for describing an example of a method of utilizing the degree-of-attention map.

FIG. 15 is a diagram for describing a use example of the degree-of-attention map 1410 in a case when the user is a caretaker of the golf field 1200. A cup position 1500 in FIG. 15 represents the position of a cup in a green determined by the user after maintenance of the hole. By referring to the degrees of attention in a green area 1501 in the degree-of-attention map 1410, the user, who is a caretaker of the golf field 1200, can determine the cup position so as to avoid spots where the degree of attention is high and the conditions are poor.

As described above, by viewing the degree-of-attention map 1410, it is possible to maintain and to design the hole while taking into account loads on the golf field that are difficult to find by directly looking at the lawn and the greens. Accordingly, it is possible to keep the conditions of the lawn and the green in good quality.

Embodiment 3

There has been an increasing demand to detect the presence of allergens in certain areas due to the increase in prevalence of allergic diseases, and the like. However, it is difficult to visually recognize minute substances, such as allergens from a captured image.

In view of such circumstances, in Embodiment 3, an example of detecting spots where food allergens are likely to be present based on the contents of actions of persons will be described. In the present embodiment, its difference from Embodiment 1 will be mainly described. Features that are not particularly specified are the same components and processes as those in Embodiment 1.

[Target Area for Generating Degree-of-Attention Maps]

Figure 16:
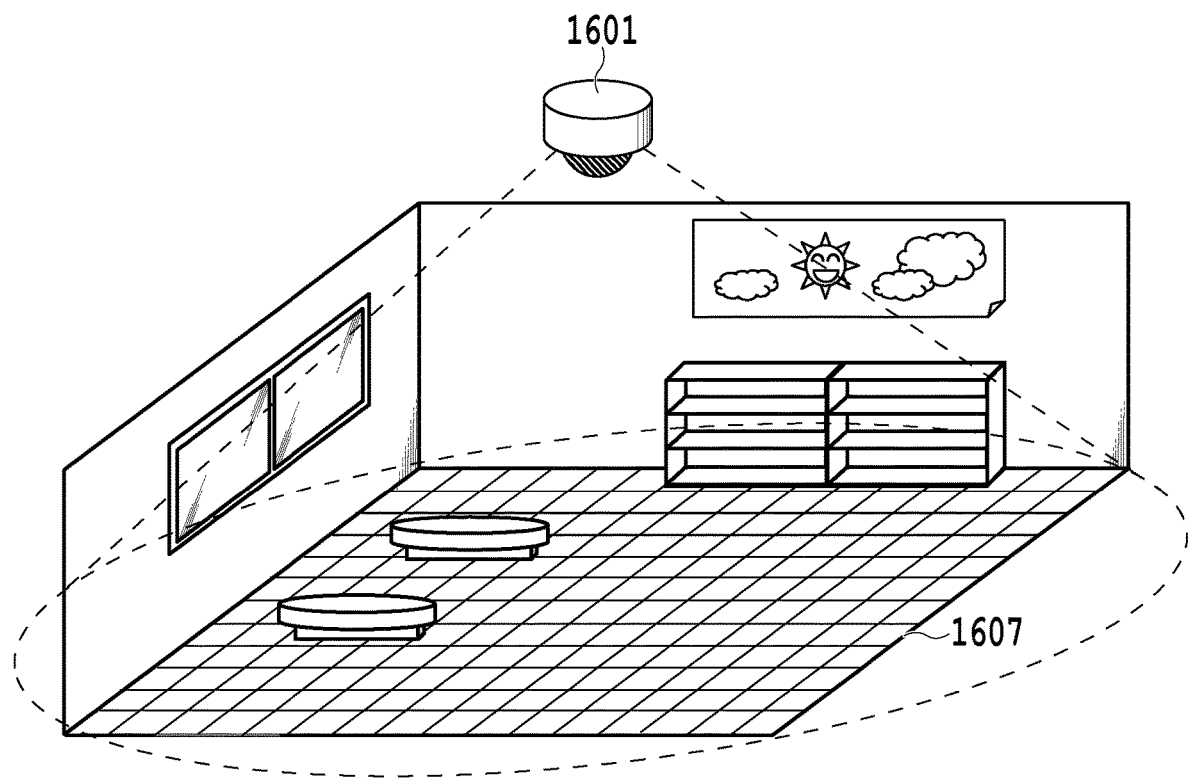
FIG. 16 is a diagram illustrating an example of a target area for generating degree-of-attention maps.

FIG. 16 is a diagram illustrating the inside of a preschool where the image capture apparatus 110 of the attention-required spot detection system in the present embodiment captures images. In the present embodiment, the inside of the preschool is the target area for generating degree-ofattention maps 1607. In a case when the image capture range is, for example, inside a room in the preschool, a top camera 1601 may be disposed as the image capture apparatus 110.

The present embodiment will be described on the assumption that the degree of attention indicates the degree of possibility that an allergen is present. In other words, the degree of attention indicates the degree of spread of an allergen. A higher value of the degree of attention indicates a higher possibility that an allergen is present (has spread) in the rectangular area associated with that degree of attention. For this reason, the degree of attention in the present embodiment also indicates the degree of necessity of maintenance, as in the embodiments described above. The description will be given on the assumption that the minimum value of the degree of attention is zero and the maximum value is not limited.

Cases have been reported in which a person develops an allergic symptom after coming into contact with only a very small amount of allergen. The risk of such a case is high in settings where people live or spend time together, such as preschools. In order to reduce the risk of contact with an allergen, the attention-required spot detection system in the present embodiment generates and updates the degree-of-attention maps 1607 such that positions inside the preschool where allergens are likely to be present can be checked.

Figure 17:
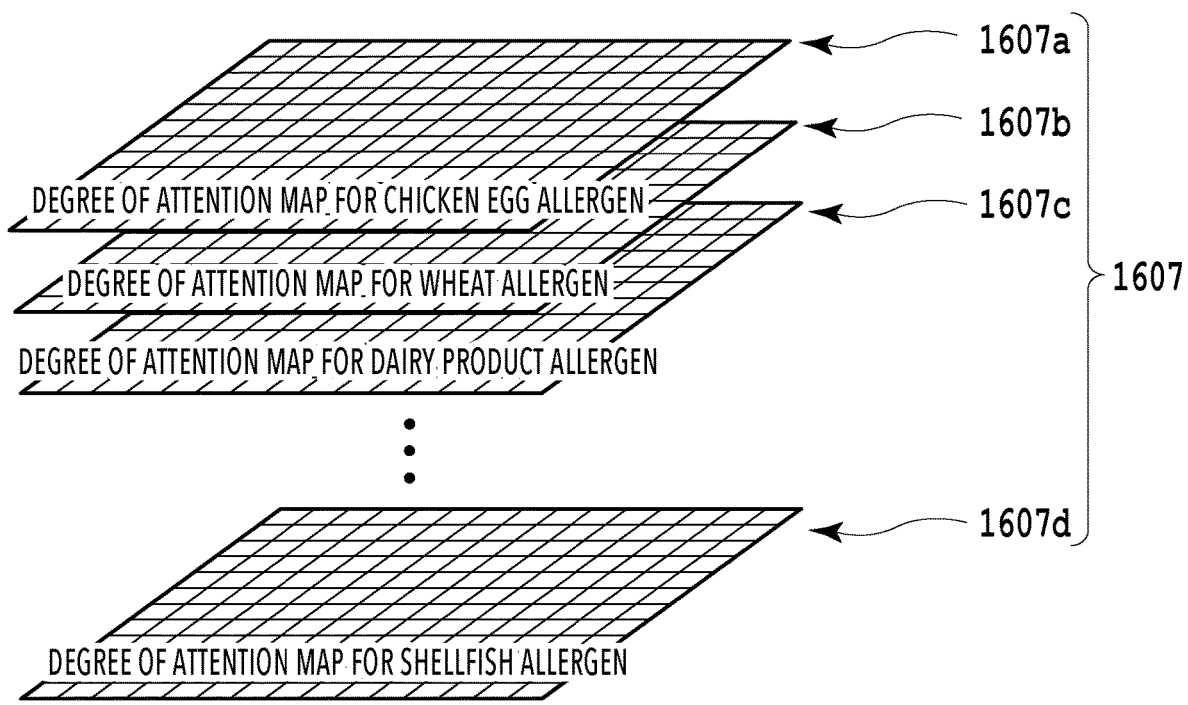
FIG. 17 is a diagram illustrating an example of degree-of-attention maps for allergens to be controlled.

FIG. 17 is a diagram illustrating the degree-of-attention maps in the present embodiment. There may be multiple kinds of allergens to be controlled. In this case, a degree-of-attention map is generated individually for each allergen to be controlled, as illustrated in FIG. 17. In a case when the allergens to be controlled are at least chicken egg allergen, wheat allergen, dairy products allergen, and shellfish products allergen, degree-of-attention maps 1607*a* to 1607*d* are generated for the food allergens of chicken egg allergen, wheat allergen, dairy products allergen, and shellfish products allergen, respectively.

The kinds of allergens to be controlled are, for example, seven specific raw substances which can cause serious symptoms. In a case when there is a student in the preschool who has an allergic symptom, the allergen that causes that allergic symptom may be additionally added as an allergen to be controlled. Thus, the allergens to be controlled may be selected based on the user's need.

[Functional Configuration]

Figure 18:
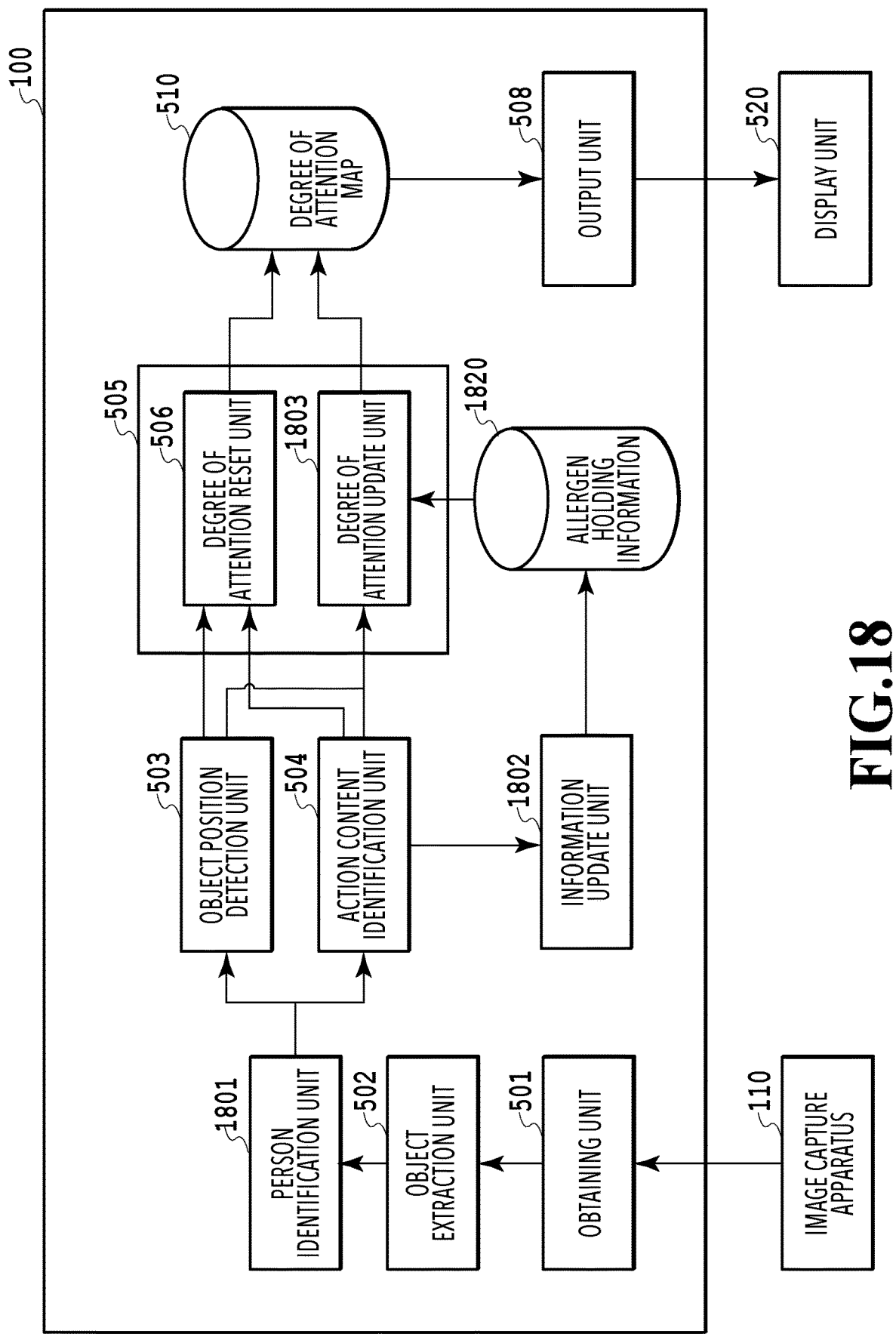
FIG. 18 is a block diagram illustrating an example of a functional configuration of an information processing apparatus.

FIG. 18 is a block diagram illustrating a functional configuration of the information processing apparatus 100. The information processing apparatus 100 in the present embodiment identifies a preschooler who consumed a food allergen, which is an allergic food, and updates the degree of attention in the corresponding degree-of-attention map 1607 based on the position of the preschooler and the content of the action of the preschooler.

The information processing apparatus 100 has an obtaining unit 501, an object extraction unit 502, an object position detection unit 503, an action content identification unit 504, a degree-of-attention reset unit 506, a degree-of-attention update unit 1803, a person identification unit 1801, an information update unit 1802, and an output unit 508. The same components as those in Embodiment 1 are denoted by the same reference signs, and detailed description thereof is omitted.

The obtaining unit 501 obtains an image captured by the image capture apparatus 110.

The object extraction unit 502 extracts objects from the image captured by the image capture apparatus 110. In the present embodiment, objects are persons such as preschoolers or childcare workers.

The person identification unit 1801 identifies who the objects extracted by the object extraction unit 502 are. The present embodiment will be described on the assumption that the person identification unit 1801 identifies the personal names of persons who are objects, but the person identification unit 1801 may identify identifications (IDs) assigned to the persons. A method of identifying persons can be implemented by utilizing a face authentication technology, a person tracking technology, or the like, for example.

The object position detection unit 503 detects the positions of the objects extracted by the object extraction unit 502.

The function of the action content identification unit 504 is similar to that in Embodiment 1 except that the action content identification unit 504 in the present embodiment identifies the contents of actions of the objects from among the contents of actions held in a column 2001 in a degree-of-attention update table 2000 in the present embodiment (see FIG. 20) as well as "dietary action", "gargle", and "hand wash". The action content identification unit 504 is configured such that, in a case of identifying "dietary action" as the content of an action, the action content identification unit 504 identifies the content of the meal as well. Incidentally, "dietary action" is an example of a person's action that results in holding an allergen, but the action that results in holding an allergen is not limited to a dietary action. Note that "Gargle" and "hand wash" are examples of a person's action to get rid of the held allergen, but the action to get rid of the allergen is not limited to "gargle" and "hand wash".

The action content identification unit 504 identifies the content of an action by using a trained model trained to output any one of the contents of the actions held in the column 2001 in the degree-of-attention update table 2000 (see FIG. 20), "dietary action", "gargle", or "hand wash".

The information update unit 1802 updates the contents of the allergen holding information 1900 (see FIG. 19). The updated allergen holding information 1900 is stored in a storage unit 1820 of the attention-required spot detection system. The allergen holding information 1900 will be described later.

The degree-of-attention update unit 1803 determines values for updating the degrees of attention at the positions on the degree-of-attention maps 1607 detected by the object position detection unit 503 (update values) and updates the degrees of attention. The degree-of-attention update unit 1803 updates the degrees of attention while taking the allergen holding information 1900 (see FIG. 19) into account. Details will be described later.

In a case when an update value determined by the degree-of-attention update unit 1803 is "reset", the degree-of-attention reset unit 506 resets the degrees of attention in the degree-of-attention maps associated with the corresponding position detected by the object position detection unit 503 to zero.

The output unit 508 outputs the degree-of-attention maps stored in the storage unit 510 of the attention-required spot detection system via the IF 104 such that the degree-of-attention maps can be displayed on the display unit 520.

[Allergen Holding Information]

FIG. 19 is a diagram illustrating a table representing the allergen holding information 1900, which is data on allergens held by individual objects. The allergen holding information 1900 is information for managing what allergens persons in the preschool (preschoolers and childcare workers) are currently holding, and personal names and allergens currently held by the persons corresponding to the personal names are associated with one another.

A column 1901 in the allergen holding information 1900 holds personal names identifiable by the person identification unit 1801. The allergen holding information 1900 in FIG. 19 is generated in a case when the inside of the preschool is the image capture target for the image capture apparatus 110, and the column 1901 holds the personal names of preschoolers and childcare workers registered in the image capture target preschool.

A column 1902 in the allergen holding information 1900 holds the names of the allergens currently held by the persons with the personal names in the column 1902. The allergens in the column 1902 are updated by the information update unit 1802 on an as-needed basis. Specifically, in a case when the content of an action identified by the action content identification unit 504 is "dietary action", the information update unit 1802 identifies the row including the corresponding personal name identified by the person identification unit 1801 in the column 1901. In a case when the food in the "dietary action" contains the allergen(s) to be controlled in the column 1902 of the identified row, the information update unit 1802 adds the allergen(s). For example, in a case when the personal name identified by the person identification unit 1801 is "Preschooler B" and the action content identification unit 504 identifies that Preschooler B did a dietary action of eating food containing chicken egg, "chicken egg" is newly added to the column 1902 in a row 1903 including "Preschooler B".

In a case when the content of an action identified by the action content identification unit 504 is "gargle" or "hand wash", too, the information update unit 1802 identifies the row including the corresponding personal name identified by the person identification unit 1801 in the column 1901. The information update unit 1802 then deletes the allergen(s) held in the column 1902 in the identified row.

In a case when a dietary action is identified, an update is made to the allergen(s) included in the column 1902 in the allergen holding information 1900. However, the column 1902 does not reflect information on the meals the preschoolers had before going to school. Thus, information on the menus of the meals before school may be obtained from the parents via the IF 104. The information processing apparatus 100 may have a function of updating the allergen holding information 1900 such that an allergen to be controlled is held in the column 1902 in a case when the meal a preschooler had before going school contained that allergen.

[Degree-of-attention Update Table]

FIG. 20 is a diagram illustrating an example of the degree-of-attention update table in the present embodiment. In the degree-of-attention update table 2000 in FIG. 20, the contents of actions of persons and values for updating the degree of attention are associated with one another.

The contents of actions held in the column 2001 in the degree-of-attention update table 2000 in FIG. 20 are the contents of actions which persons are likely to perform.

A column 2002 in the degree-of-attention update table 2000 holds values for updating the degrees of attention corresponding to the contents of actions in the column 2001. In the present embodiment, a higher value of the degree of attention indicates a higher possibility of contact with an allergen(s). Thus, the values held in the column 2002 are such that, in a case when the content of an action of a person is an action that is likely to spread an allergen(s), an accordingly large positive value is associated with the content of the action.

The degree-of-attention update table 2000 in FIG. 20 includes an entry "cleaning" as the content of an action, as illustrated in a row 2003. "Cleaning" is a reset action in the present embodiment. In a case when a value determined by the degree-of-attention update unit 1803 is "reset", the degree-of-attention reset unit 506 resets the degrees of attention in the degree-of-attention maps associated with the corresponding position detected by the object position detection unit 503 to zero.

[Flowchart]

Figure 21:
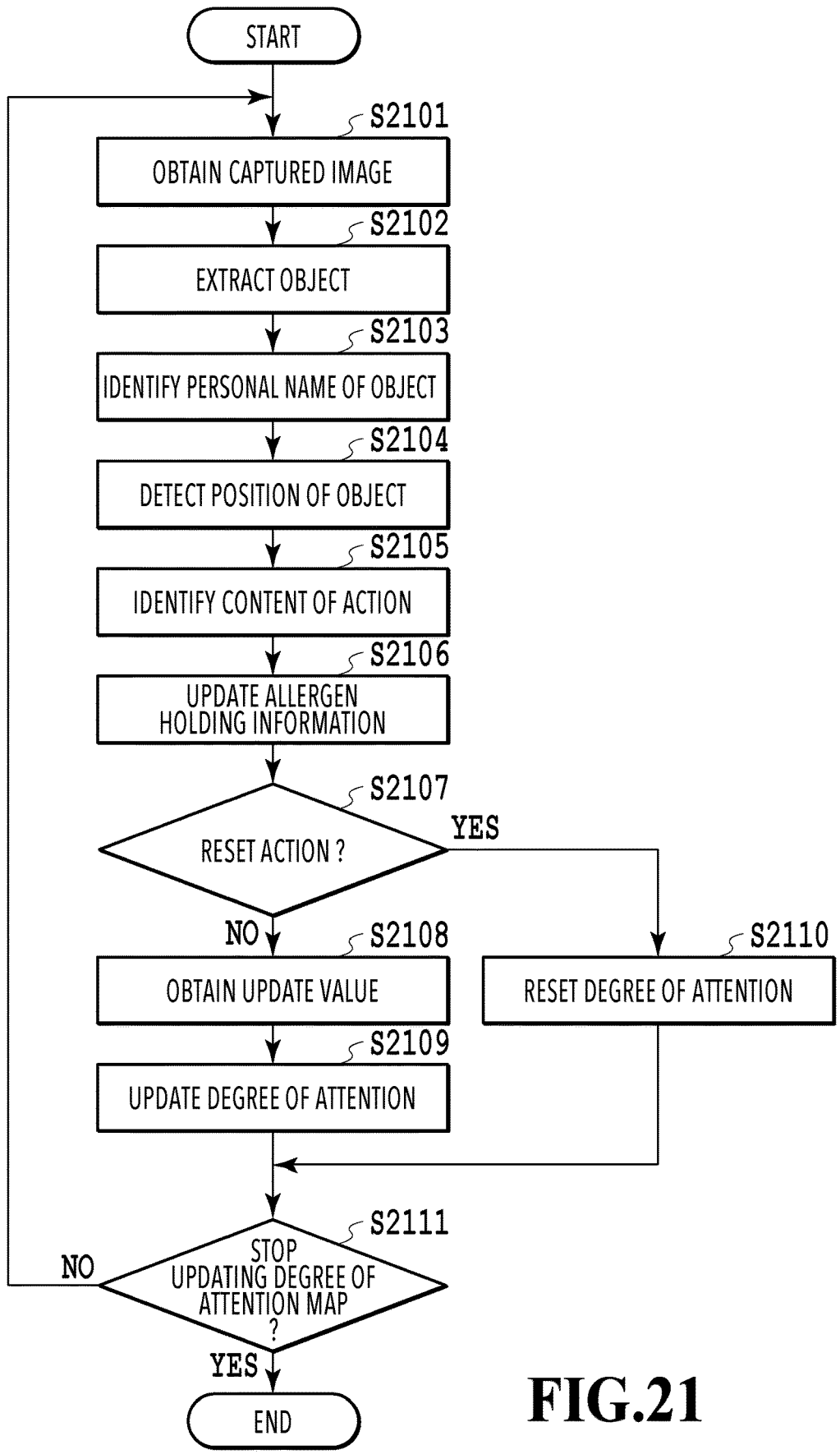
FIG. 21 is a flowchart for describing an example of processing in a process of updating the degree of attention.

FIG. 21 is a flowchart illustrating a processing procedure for updating the degrees of attention in the degree-of-attention maps and the allergen holding information by the information processing apparatus 100.

In S2101, which is the same step as S701, the obtaining unit 501 obtains an image captured by the image capture apparatus 110.

In S2102, which is the same step as S702, the object extraction unit 502 extracts an object included in the captured image obtained in S2101.

In S2103, the person identification unit 1801 identifies the personal name of the object (person) extracted in S2102.

In S2104, which is the same step as S703, the object position detection unit 503 detects the position of the object extracted in S2102 on the degree-of-attention maps 1607, the position being one at the time of the image capture.

In S2105, the action content identification unit 504 identifies (specifies) the content of the action of the object extracted in S2102. The action content identification unit 504 identifies the content of the action of the object from among the contents of actions held in the column 2001 in the degree-of-attention update table 2000 as well as a dietary action, gargle, and hand wash.

In S2106, the information update unit 1802 updates the allergen holding information 1900 in a case when the content of the action identified in S2105 is a dietary action, hand wash, or gargle, as described earlier. Specifically, the information update unit 1802 updates the allergen(s) in the allergen holding information 1900 associated with the personal name identified by the person identification unit 1801 based on the identified content of the action.

In S2107, the degree-of-attention reset unit 506 determines whether the content of the action identified in S2105 is a reset action. As mentioned earlier, the reset action in the present embodiment is "cleaning".

If the identified action is not determined to be the reset action (NO in S2107), the processing proceeds to S2108.

In S2108, the degree-of-attention update unit 1803 identifies the row in the degree-of-attention update table 2000 in FIG. 20 including the content of the action identified in S2105 in the column 2001, and obtains the update value included in the column 2002 in the identified row. Moreover, the degree-of-attention update unit 507 obtains the name of the allergen(s) in the allergen holding information 1900 in FIG. 19 associated with the personal name identified in S2103.

The processing then proceeds to S2109, in which the degree-of-attention update unit 1803 updates the degree of attention in the degree-of-attention map corresponding to the name of the allergen(s) obtained in S2108.

Suppose, for example, that "Preschooler A" is identified as the personal name of the object in S2103, and "sneeze" is identified as the content of the action of the object in S2105. In this case, "chicken egg" and "wheat", which are the names of allergens currently held by "Preschooler A", are obtained from the allergen holding information 1900 in FIG. 19.

In this case, the degree-of-attention update unit 507 updates the degree of attention in the degree-of-attention map 1607*a* for "chicken egg" and the degree of attention in the degree-of-attention map 1607*b* for "wheat" by using "40" in the degree-of-attention update table 2000 in FIG. 20 associated with "sneeze". Specifically, the degree-of-attention update unit 507 adds "40" to the current degrees of attention at the rectangular areas in the degree-of-attention maps 1607*a* and 1607*b* covering the position detected in S2104. The degree-of-attention update unit 507 then updates the degrees of attention at the rectangular areas in the degree-of-attention maps covering the position detected in S2104 to the added values.

In a case when the person identified in S2103 is holding no allergen, the degrees of attention in the degree-of-attention maps will not be updated regardless of the content of the action identified in S2105.

If, on the other hand, the identified action is determined to be the reset action (YES in S2107), the processing shifts to S2110. In S2110, the degree-of-attention reset unit 506 resets the values of the degrees of attention at the rectangular areas in the degree-of-attention maps 1607*a* to 1607*d* for all allergens covering the position detected in S2104.

After S2109 or S2110, the degree-of-attention map 1607 is updated. The processing returns to S2101 after completing S2109 or S2110. After returning to S2101 and obtaining an image (frame) captured at the next time, S2102 to S2110 are performed. If, on the other hand, an instruction to stop updating the degree-of-attention maps is received from the user due to maintenance or the like (YES in S2111), the flowchart ends.

[Degree-of-attention maps Output as Result of Processing]

Figure 22:
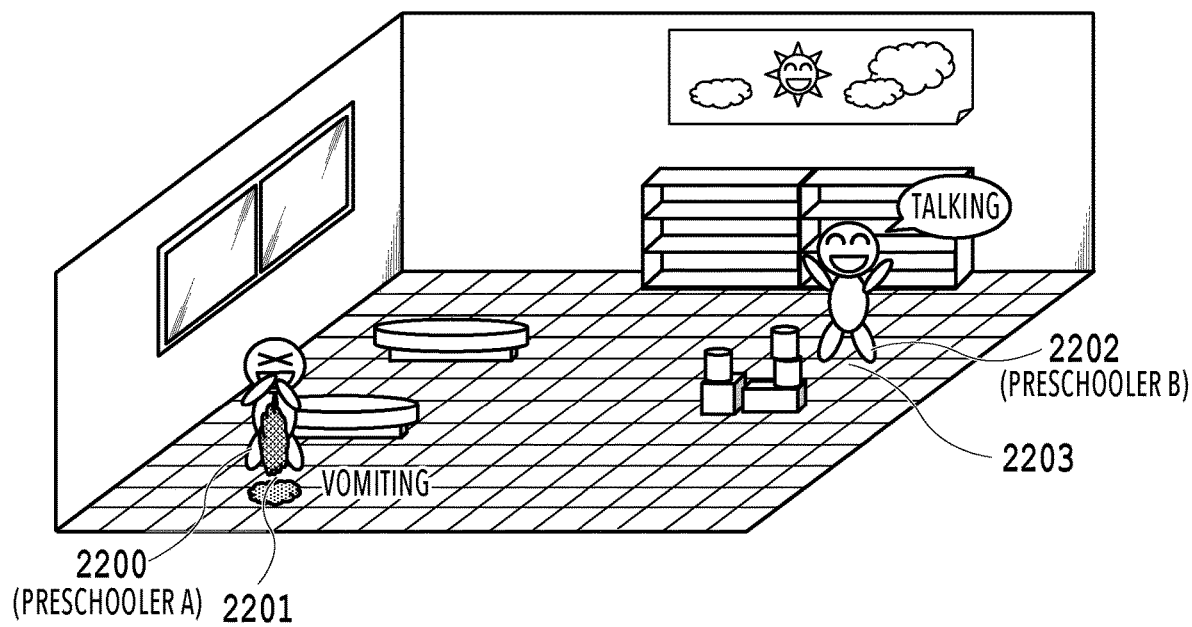
FIG. 22 is a diagram illustrating an example of the target area for generating the degree-of-attention maps.

FIG. 22 is a diagram illustrating an example of actions of preschoolers inside a preschool being a target area for generating the degree-of-attention maps 1607 in the present embodiment. The diagram indicates that a preschooler 2200 with a personal name "Preschooler A" has vomited at a position 2201, and a preschooler 2202 with a personal name "Preschooler B" is talking at a position 2203. Assuming that the allergen holding information is in the state illustrated in FIG. 19, the preschooler 2200 (Preschooler A) is holding chicken egg allergen and wheat allergen, and the preschooler 2202 (Preschooler B) is holding only a wheat allergen.

Figure 23A:
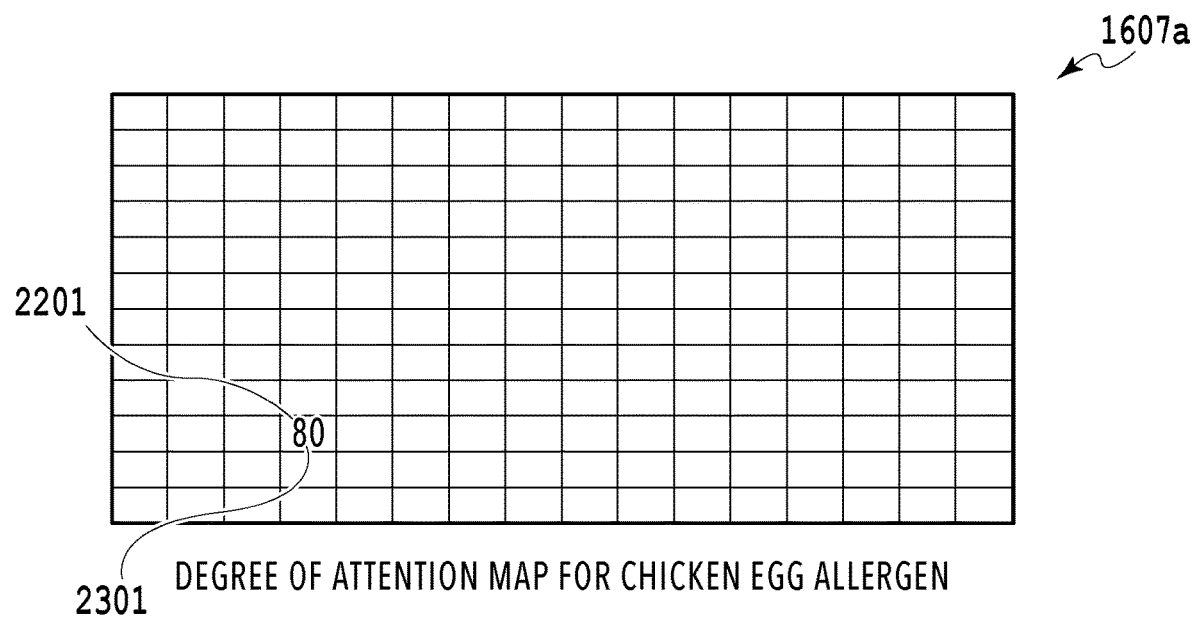
FIGS. 23A and 23B are diagrams illustrating an example of some degree-of-attention maps after updating the degree of attention.
Figure 23B:
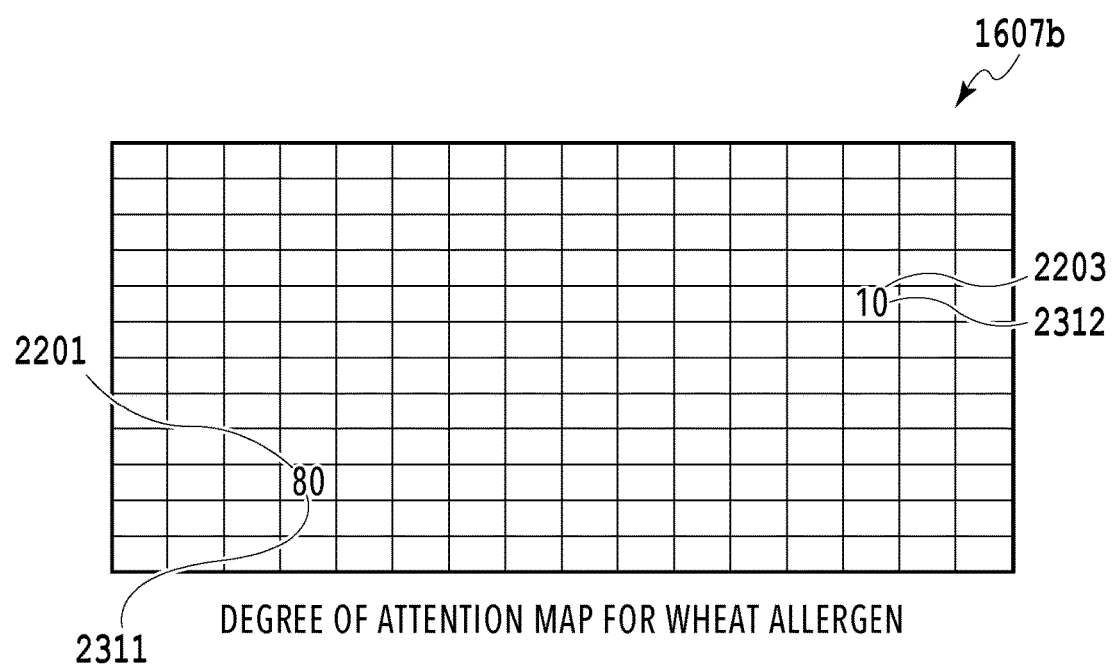

FIGS. 23A and 23B are diagrams illustrating an example of degree-of-attention maps generated (updated) by executing the flowchart of FIG. 21. The degree-of-attention maps 1607*a* and 1607*b* in FIGS. 23A and 23B are degree-of-attention maps updated and generated based on images (frames) of the preschool in FIG. 22 captured by the image capture apparatus 110 at multiple times.

The numbers inside some rectangular areas obtained by dividing the degree-of-attention maps 1607*a* and 1607*b* in FIGS. 23A and 23B are values indicating the degrees of attention associated with the rectangular areas, and represent the degrees of attention updated by repeating executing the flowchart of FIG. 21. In FIGS. 23A and 23B, the rectangular areas with a degree of attention of zero do not show a value indicating that degree of attention. Suppose that the degree of attention at each rectangular area was zero before starting the flowchart of FIG. 21.

Based on the content of the action of the preschooler 2200 (Preschooler A) holding chicken egg allergens and wheat allergen, only the degrees of attention in the degree-of-attention maps 1607*a* and 1607*b*, which correspond to the names of the allergens held by the preschooler 2200 (Preschooler A), are updated. The degrees of attention in the other degree-of-attention maps 1607*c* and 1607*d* are not updated.

First, from the degree-of-attention update table 2000, the value "80", which is associated with the content of the action "vomit" of the preschooler 2200 (Preschooler A) holding chicken egg allergen and wheat allergen, is obtained. Then, "80" is added to the degree of attention at a rectangular area 2301 in the degree-of-attention map 1607*a* for chicken egg covering the position 2201 of the preschooler 2200. Also, "80" is added to the degree of attention at a rectangular area 2311 in the degree-of-attention map 1607*b* for wheat. Accordingly, the degree-of-attention maps 1607*a* and 1607*b* are updated such that "80" is simply associated with the rectangular area 2301 in the degree-of-attention map 1607*a* and the rectangular area 2311 in the degree-of-attention map 1607*b* as the corresponding degrees of attention.

Similarly, based on the content of the action of the preschooler 2202 (Preschooler B) holding only a wheat allergen, only the degree of attention in the degree-of-attention map 1607*b* for wheat allergens, which corresponds to the held allergen, is updated. From the degree-of-attention update table 2000, the value "10", which is associated with the content of the action "talking" of the preschooler 2202 (Preschooler B) holding only a wheat allergen, is obtained. Then, "10" is added to the degree of attention at a rectangular area 2312 covering the position 2203 of the preschooler 2202. Accordingly, the degree-of-attention map 1607*b* is updated such that "10" is simply associated with the rectangular area 2312 in the degree-of-attention map 1607*b* as the corresponding degree of attention.

In a case when the user of the degree-of-attention maps 1607 is an administrator of the preschool, the user can recognize spots in the preschool where allergens are likely to be present by viewing the degree-of-attention maps 1607 displayed on the display unit 520. This enables the user to operate the preschool such that an area where the degree of attention is higher than a predetermined value is preferentially cleaned.

FIG. 24 is a diagram illustrating an example of a method of controlling allergens that cause allergic reactions for individual preschoolers in the preschool. In the example of FIG. 24, a column 2401 holding allergens that causes allergic reactions for individual preschoolers is added to the allergen holding information 1900. Specifically, the column 2401 holds allergy information that is information on the allergies of the persons corresponding to the personal names included in the column 1901. The information processing apparatus 100 may have a function of notifying the user of a warning in a case when any of the preschoolers who exhibits an allergic reaction to a particular allergen gets near a spot in the degree-of-attention map for that allergen where the degree of attention is high.

Figure 25:
FIG. 25 is a diagram illustrating an example of the allergen holding information.

FIG. 25 is a diagram for explaining another example of the method of controlling the held allergens in the allergen holding information 1900. The action content identification unit 504 identifies the contents of actions of objects by using a trained model trained to be capable of identifying the contents of more specific dietary actions, such as "putting food into the mouth", "touching food with the hands", and "spilling food over the clothes". In this case, if the action content identification unit 504 identifies "putting food into the mouth" as the content of an action of an object, the user can notice that the allergen contained in that food is held inside the mouth. If the action content identification unit 504 identifies "touching food with the hands" as the content of an action of an object, the user can notice that the allergen contained in that food is held on the fingers. If the action content identification unit 504 identifies "spilling food over the clothes" as the content of an action of an object, the user can notice that the allergen contained in that food is held on the clothes. Thus, as illustrated in FIG. 25, allergens held by objects may be managed in the allergen holding information 1900 in association with where the allergens are held, such as the inside of the mouth, on the fingers, and on the clothes.

By managing allergens held by persons as illustrated in FIG. 25, the information update unit 1802 can, for example, delete only the allergen associated with "fingers" in a case where "hand wash" is identified as the content of an action of an object. This enables detailed management of allergens held by preschoolers or childcare workers.

As described above, according to the present embodiment, it is possible to indicate areas where allergens are likely to be present based on the positions of persons and the contents of their actions.

The degree of attention in the present embodiment is updated so as to become higher in response to performing an action producing droplets or an action involving contact. Hence, the degree of attention in the present embodiment can be used as a value indicating the extent to which a minute substance such as a virus or a germ is present. Also, the description has been given on the assumption that the objects to be extracted are humans, but the objects may be animals other than humans.

OTHER EMBODIMENTS

Embodiments 1 and 2 have been described above on the assumption that an area for playing a sport is the target area for generating a degree-of-attention map. Alternatively, an area other than one for playing a sport can be the target area for generating a degree-of-attention map. For example, a yard of a house or the inside of a building, such as a house, may be the target area for generating a degree-of-attention map. In this case, the degree-of-attention update table may be generated such that the higher the degree of necessity of cleaning, the higher the degree of attention.

The present disclosure can be embodied in the form of, for example, a system, an apparatus, a data processing method, a program, a storage medium, or the like. Specifically, the present disclosure may be applied to a system comprising multiple pieces of equipment or an apparatus comprising a single piece of equipment.

According to the present disclosure, a user can know an evaluation value at each of positions in a predetermined area.

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus comprising:
one or more memories storing instructions; and
one or more processors executing the instructions:
to obtain an image captured of an area where an object is performing an activity;
to detect a position of the object present in the area based on the obtained captured image;
to specify an action of the object based on the obtained captured image, the action being an action that is performed by the object at the detected position and deteriorates in a state at the detected position, wherein, even after the object becomes no longer present at the detected position due to the action, the deteriorated state at the detected position is maintained; and
to output information in which a position in the area and an evaluation value are associated with each other and that is generated based on the detected position and the specified action, the evaluation value being calculated based on an index value corresponding to the specified action, and a first index value corresponding to a first action and a second index value corresponding to a second action that is different from the first action.

2. The information processing apparatus according to claim 1, wherein the evaluation value is a value representing a degree of necessity of maintenance.

3. The information processing apparatus according to claim 2, wherein a higher value of the evaluation value represents a higher degree of necessity of maintenance.

4. The information processing apparatus according to claim 3, wherein the evaluation value in the information associated with the detected position of the object is updated by adding the index value corresponding to the specified action, and
the index value associated with an action other than an activity related to maintenance is a positive value.

5. The information processing apparatus according to claim 4, wherein the index value associated with an action related to maintenance is a negative value.

6. The information processing apparatus according to claim 1, wherein the evaluation value in the information associated with the detected position of the object is reset in a case when the specified action is an action related to maintenance.

7. The information processing apparatus according to claim 1, wherein the one or more processors further execute the instructions to extract the object from the obtained captured image, the detected position is a position of the extracted object, and the specified action is an action of the extracted object.

8. The information processing apparatus according to claim 1, wherein the information is a map representing the area.

9. The information processing apparatus according to claim 8, wherein the map is divided into sections of a predetermined size, and the section where the object was present is detected as the position of the object.

10. The information processing apparatus according to claim 1, wherein the area is a skating rink, and at least jumping and skating are specified as actions of the object.

11. The information processing apparatus according to claim 1, wherein the area is a golf course, and at least a shot and an action on a green are specified as actions of the object.

12. The information processing apparatus according to claim 1, wherein the one or more processors further execute the instructions:
to specify an object present in the area;
to obtain data on allergens held by the object; and,
in a case when a first object specified as an object present in the area is holding a target allergen, to update the information based on a position where the first object is detected and the action of the first object.

13. The information processing apparatus according to claim 12, wherein the information corresponding to the target allergen is updated in a case when the first object is holding the target allergen.

14. The information processing apparatus according to claim 12, wherein the one or more processors further execute the instructions to update the data on the allergen held by the specified object based on action of the object.

15. The information processing apparatus according to claim 14, wherein a content of a meal for a second object specified as an object present in the area is specified based on the captured image, and
the data on the allergen held by the second object is updated based on the specified content of the meal.

16. The information processing apparatus according to claim 14, wherein the data on the allergen held by an object is updated based on a content of a meal for the object before the object was present in the area.

17. The information processing apparatus according to claim 12, wherein the information is updated in a case when the action of the first object is an action that spreads an allergen.

18. The information processing apparatus according to claim 12, wherein a higher value of the evaluation value indicates a greater extent to which a target allergen is present.

19. An information processing method comprising:
obtaining an image captured of an area where an object is performing an activity;
detecting a position of the object present in the area based on the obtained captured image;
specifying an action of the object based on the obtained captured image, the action being an action that is performed by the object at the detected position and deteriorates in a state at the detected position, wherein, even after the object becomes no longer present at the detected position due to the action, the deteriorated state at the detected position is maintained; and
outputting information in which a position in the area and an evaluation value are associated with each other, and that is generated based on the detected position and the specified action, the evaluation value being calculated based on an index value corresponding to the specified action, and a first index value corresponding to a first action and a second index value corresponding to a second action that is different from the first action.

20. A non-transitory computer readable storage medium storing a program that causes a computer to perform an information processing method, the information processing method comprising:
obtaining an image captured of an area where an object is performing an activity;
detecting a position of the object present in the area based on the obtained captured image;
specifying an action of the object based on the obtained captured image, the action being an action that is performed by the object at the detected position and deteriorates in a state at the detected position, wherein, even after the object becomes no longer present at the detected position due to the action, the deteriorated state at the detected position is maintained; and
outputting information in which a position in the area and an evaluation value are associated with each other, and that is generated based on the detected position and the specified action, the evaluation value being calculated based on an index value corresponding to the specified action, and a first index value corresponding to a first action and a second index value corresponding to a second action that is different from the first action.

* * * * *